US008362735B2

(12) United States Patent
Marcoccia

(10) Patent No.: US 8,362,735 B2
(45) Date of Patent: Jan. 29, 2013

(54) SINGLE PHASE MOTOR ENERGY ECONOMIZER FOR REGULATING THE USE OF ELECTRICITY

(75) Inventor: Mario M. Marcoccia, Hialeah, FL (US)

(73) Assignee: Protective Energy Economizer Technology, Grand Cayman (KY)

( * ) Notice: Subject to any disclaimer, the term of this patent is extended or adjusted under 35 U.S.C. 154(b) by 133 days.

(21) Appl. No.: 13/041,686

(22) Filed: Mar. 7, 2011

(65) Prior Publication Data

US 2012/0229070 A1   Sep. 13, 2012

(51) Int. Cl.
*H02P 1/42* (2006.01)
*H02P 3/18* (2006.01)

(52) U.S. Cl. ........ 318/729; 318/727; 318/799; 318/801; 318/438; 318/812; 318/774; 318/599; 318/798; 318/806; 318/811; 323/205; 323/210; 323/211; 323/241; 323/218; 323/233

(58) Field of Classification Search .................. 318/727, 318/729, 799, 801, 438, 774, 599, 812, 798, 318/806, 811; 323/205, 210, 211, 241, 208, 323/218, 233
See application file for complete search history.

(56) References Cited

U.S. PATENT DOCUMENTS

| 1,481,318 | A |   | 10/1924 | Hellmund |         |
|-----------|---|---|---------|----------|---------|
| 4,019,104 | A |   | 4/1977  | Parker   |         |
| 4,052,648 | A | * | 10/1977 | Nola     | 318/810 |
| 4,266,177 | A | * | 5/1981  | Nola     | 318/810 |
| 4,297,628 | A |   | 10/1981 | Hedges   |         |
| 4,323,835 | A | * | 4/1982  | Lee      | 318/729 |
| 4,369,403 | A | * | 1/1983  | Lee      | 318/729 |
| 4,400,657 | A | * | 8/1983  | Nola     | 318/798 |
| 4,414,499 | A | * | 11/1983 | Hedges   | 318/798 |
| 4,417,190 | A | * | 11/1983 | Nola     | 318/729 |
| 4,426,614 | A | * | 1/1984  | Nola     | 323/243 |
| 4,439,718 | A | * | 3/1984  | Nola     | 318/729 |
| 4,806,383 | A |   | 2/1989  | Weber    |         |
| 4,823,067 | A |   | 4/1989  | Weber    |         |
| 4,864,212 | A |   | 9/1989  | Parker et al. |    |
| 4,910,450 | A |   | 3/1990  | Parker et al. |    |
| 5,013,990 | A |   | 5/1991  | Weber    |         |
| 6,374,631 | B1|   | 4/2002  | Lifson et al. |    |
| 6,400,119 | B1|   | 6/2002  | Garze et al.  |    |
| 6,559,619 | B1| * | 5/2003  | Bach     | 318/729 |
| 2009/0157332 | A1 |   | 6/2009 | Choi     |        |
| 2010/0102771 | A1 |   | 4/2010 | Anderson |        |

FOREIGN PATENT DOCUMENTS

| JP | 2133094 A | 5/1990 |
| KR | 20010000187 A | 1/2001 |
| RU | 2433519 C2 | 11/2011 |
| WO | 8103586 A1 | 12/1981 |

* cited by examiner

*Primary Examiner* — Rita Leykin
(74) *Attorney, Agent, or Firm* — Larson & Larson, P.A.; Frank Liebenow; Justin P. Miller

(57) ABSTRACT

A device for improving efficiency of an induction motor that soft-starts the motor by applying a voltage to the motor that is substantially less than the rated voltage then gradually increasing the voltage while monitoring changes in current drawn by the motor, thereby detecting when maximum efficiency is found. Once maximum efficiency is found, the nominal motor current is found and operating ranges are set. Now, the voltage to the motor is increased/decreased by measuring the phase angle between the voltage and the current to the motor and increasing the voltage when the phase angle is less than a minimum phase angle (determined during soft-start) and decreasing the voltage when the phase angle is greater than or equal to the minimum phase angle as long as the voltage does not fall below a minimum voltage determined during soft-start.

20 Claims, 29 Drawing Sheets

SINGLE PHASE MOTOR ENERGY ECONOMIZER FOR REGULATING THE USE OF ELECTRICITY

FIELD

This invention relates to the field of electric motors and more particularly to a system, device and apparatus for controlling power to AC induction motors for power conservation and other features.

BACKGROUND

Alternating current electric motors are typically engineered to provide a maximum power (horsepower) output under load at a particular constant operating voltage. Unfortunately, during most of the life of such a motor, the motor is grossly underutilized and wastes a considerable amount of electric power. When such motors operate at anything less than a full load, any extra power provided to the motor is converted into waste heat by the windings of the motor. Induction motors are used in many applications such as refrigerators and air-conditioners, elevators, pool systems, boat lifts, washing machines, clothes driers, air compressors, etc. This type of motor is more reliable because it does not have brushes, is relatively quiet when operating and has predictable design performance characteristics.

Induction motors are less efficient when not fully loaded. A typical 1/3-horsepower induction motor draws about 6.6 amperes and exhibits a power conversion factor of about 80% under full load. This same motor has poor efficiency under a light load because of internal losses. Although the power factor may drop to 30% or so, the current consumed still remains high. Under no load, the same motor draws around 4.9 amperes; even though little or no useful work is being performed because there is no load on the motor.

It is well known that eddy current contributes to efficiency loss, particularly when operating under less than full load. This power loss is converted to heat, making the motor structure operate at a higher temperature, thereby, lowering the life expectancy of motor components such as bearings. Additionally, the heat enters the environment, requiring cooling of the area around the motor and contributing to heat build-up in buildings; an undesirable consequence when the buildings are being air-conditioned.

In lightly loaded induction motors, the rotor turns slightly faster than when it is heavily loaded, resulting in an increase in the stator inductance, resulting in a low power factor. This increase in rotational speed was measured in the prior art with devices such as tachometers and fed back into a motor control circuit. The circuit would then reduce power to the motor when the circuit detected that the motor was lightly loaded. By reducing the applied stator voltage the magnetic field is weakened and the rotor torque is lessened. If the voltage or power is decreased too much, slip, drag or stalling may occur. Therefore, reductions of the applied stator voltage or power must be controlled to provide sufficient voltage/power to prevent stalling and unsatisfactory operating characteristics such as vibration. These conditions can lead a reduction of the life of the motor.

High-permeability core materials also exhibit an abrupt "knee" where magnetic saturation occurs at a specific voltage. The operating point for the core material making up the motor's stator structure is established with a high flux density under normal line voltage. An increase in line voltage can bring about a large decrease in efficiency as magnetic saturation of the core material is approached. The increased line voltage creates only increased losses in efficiency rather than additional torque. Such losses tend to produce more heating, which in turn increases the losses by, for example, increasing the resistance of the windings.

When electric utility companies reduce line voltage ("brown-out") during peak-usage periods, typical induction motors can fail by stalling or overheating. In such conditions where insufficient voltage is available for proper motor operation, it is better to not provide any voltage to the motor.

U.S. Pat. Nos. 4,806,838 and 4,823,067 reduce motor losses through the use of two separate parallel-acting run windings, one that has a higher impedance to produce a sufficient portion of field strength flux to operate the motor under partial load and the other has a lower impedance and is controlled to increase the field strength flux when the motor load increases. This requires modifications to the motor, including rewiring the winding of the motor; something not feasible for existing installations.

It is desirable to obtain power savings through improved efficiency for induction motors that have a single run winding without making modifications to the motor.

What is needed is a system, method and apparatus of controlling power to an induction motor that will reduce power consumption and protect the motor from line voltage problems, overload, etc., without modifications to the motor itself.

SUMMARY

By implementing the design using a processor, an induction motor is "soft-started" by applying a voltage to the motor that is substantially less than the rated voltage and gradually increasing the motor voltage while monitoring changes in current drawn by the motor, the nominal motor current is found (full ac Voltage applied) and operating ranges are set Now, the processor starts to decrease the motor voltage thereby detecting when maximum efficiency is found. Once maximum efficiency is found, the nominal motor current is found and operating ranges are set. Now, the processor varies the voltage to the motor by measuring the phase angle between the voltage and the current to the motor and increasing the voltage when the phase angle is less than a minimum phase angle (determined by the above step of searching for the maximum efficiency) and decreasing the voltage when the phase angle is greater than or equal to the minimum phase angle as long as the voltage does not fall below a minimum voltage determined during the start-up step of searching for the maximum efficiency.

In one embodiment, a system for saving power consumed by an induction motor is disclosed including a source of AC voltage, a processor, and a device for controlling power to the induction motor. The device for controlling power is connected in series with the source of the AC voltage and the induction motor, and is controlled by a trigger. The trigger is controlled by the processor. The processor adjusts the trigger delay into each cycle of the AC voltage, with full power supplied to the induction motor when the trigger delay is zero. A circuit for measuring current drawn by the motor and a circuit for measuring the AC voltage are interfaced to the processor. The system measures a phase difference between a phase of the AC voltage and a phase of the current using the circuit for measuring current drawn by the motor and the circuit for measuring the AC voltage. The system has firmware for initializing power to the induction motor and finding the nominal current of the motor, then determining a minimum phase angle, a minimum trigger delay, a maximum trigger delay and two over-current value, on over-current value during start-up and one over-current value while the motor is running. Additional firmware then continuously varies the trigger delay between the minimum trigger delay and the maximum trigger delay, if the trigger delay is greater than zero the trigger delay is decremented when the phase difference is less than the minimum phase angle and if the trigger delay is less than the maximum trigger delay, the trigger delay is incremented when the phase difference is greater or equal to the minimum phase angle and the trigger delay.

In another embodiment, a method for saving power consumed by an induction motor is disclosed. The method includes (a) soft starting the motor by applying a voltage to the motor that is less than a voltage rating of the motor and gradually increasing the voltage to the motor, the current to the motor being monitored to determine a nominal current then (b) calculating an over-current value from the nominal current; (c) calculating a minimum-current from the nominal current; (d) calculating an initial voltage to the motor from the nominal current; (e) setting a minimum-phase angle to a phase angle between the voltage to the motor and the current to the motor; and (f) setting a minimum-voltage to the motor to the current voltage to the motor. The (g) the phase angle between the voltage to the motor and the current to the motor is measured and (h) if the measured phase angle is less than the minimum-phase angle and the voltage to the motor is less than a full-voltage, increasing the voltage to the motor and repeating from step (g). (i) If the measured phase angle is greater than or equal to the minimum-phase angle and the voltage to the motor is greater than the minimum-voltage to the motor, decreasing the voltage to the motor and repeating from step (g).

In another embodiment, a system for saving power consumed by an induction motor is disclosed. The system includes a source of AC voltage, a processor; and a solid-state switch. The solid-state switch is connected in series with the source of the AC voltage and the induction motor and is controlled by a trigger. The trigger is controlled by the processor to fire the solid-state switch at a trigger delay into each cycle of the AC voltage, whereas full power is supplied to the induction motor when the trigger delay is zero. The system includes a circuit that measures the current drawn by the motor which is interfaced to the processor and a circuit for measuring the AC voltage, also interfaced to the processor. Software runs on the processor initializing power to the induction motor by setting the trigger delay to a value that delivers less than full voltage to the induction motor, and gradually decreasing the trigger delay while measuring a current drawn by the motor, detecting when the current decreases at which time a minimum phase angle, a maximum trigger delay and an over-current value are determined. Additional software maintains efficiency of the motor by measuring a phase difference between a phase of the AC voltage as measured by the circuit for measuring the AC voltage and a phase of the current as measured by the circuit for measuring the current, and varying the trigger delay between the minimum trigger delay and a maximum trigger delay. The trigger delay is decremented when the trigger delay is greater than zero and the phase difference is less than the minimum phase angle and the trigger delay is incremented when the trigger delay is less than the maximum trigger delay and the phase difference is greater or equal to the minimum phase angle.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION

Figure 1:
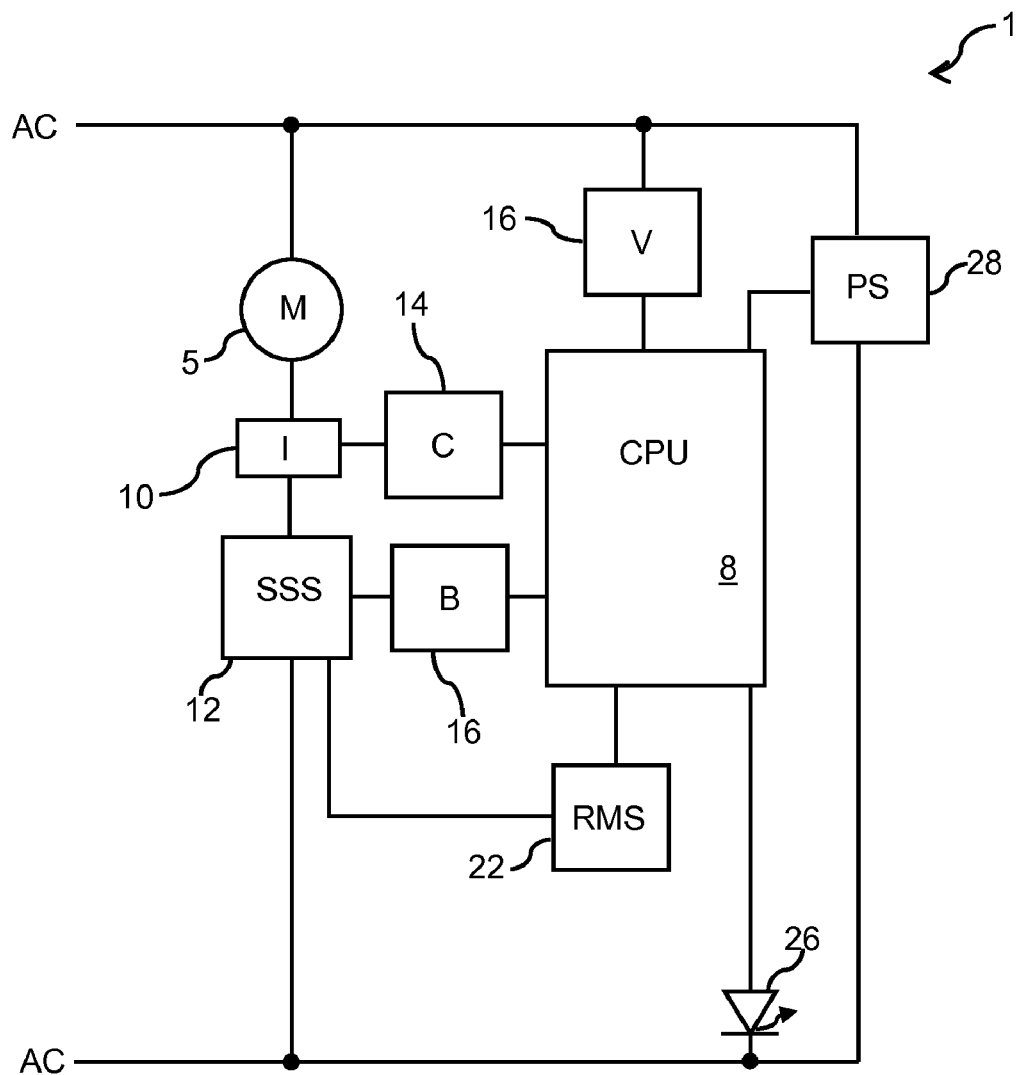
FIG. 1 illustrates a schematic view of a system for controlling a single-phase motor.

Reference will now be made in detail to the presently preferred embodiments of the invention, examples of which are illustrated in the accompanying drawings. Throughout the following detailed description, the same reference numerals refer to the same elements in all figures. The inventions disclosed are described in detail using an exemplary hardware and software system but are not limited in any way to a combined hardware and software system as many embodiments are envisioned including completely hardware solutions without an embedded processor, etc.

Controlling of an alternating current (AC) load through the use of a solid state switch (e.g. Triac, SCR, etc) is well known in the industry. In general, once such a switch is triggered, it maintains conduction until current through the solid state switch abates, as it does at the AC current zero-voltage crossing. To control an AC load between zero and 100% power, the trigger to the solid state switch is delayed past the zero-crossing of the AC voltage. This time delay between zero degrees and 180 degrees will be referred to as the trigger delay. For example, if the AC power is a 60 Hz sine wave, there are approximately 8.33 milliseconds between zero-crossings (period of the half-wave). To apply approximately 50% power to a load, the trigger is delayed for half of this period (90 degrees) or 4.16 ms.

It should be noted that, for inductive loads, the current does not stop flowing when the input voltage crosses zero but, rather, when the motor current crosses zero (e.g. flow of current stops), which lags the voltage waveform. This is shown by:

For RESISTIVE load: $(0 < \alpha \pi)$

Where: $\alpha$: Conduction angle; $V_m$: Voltage Peak of sin wave $Vrms = Vm/(2^{-1} * (1/(\pi[\pi - \alpha + \frac{1}{2} \sin(2\alpha)])^{-1})$ For INDUCTIVE load: There is a limit according minimum conduction TRIAC angle. Limited for Argument of Load Impedance:

$Z = (R + jX_L) = (R + jwL)$, then:

$/z/ = (R^2 + X_L^2)^{-1}$,; Then: $\Phi = Arctg(X_L/R_L)$

Referring to FIG. 1, a schematic view of a system for controlling a single-phase motor 1 is shown. The heart of this motor control 1 is a processor 8 which is any known processor 8 but preferably a microprocessor 8 such as a single chip microcontroller 8, etc. The processor 8 has a program that executes and reads inputs from other components in the system, and produces outputs for controlling other components in the system.

It is anticipated that the program that executes within the processor 8 is capable of being pre-programmed with data specific to the motor 5, such as minimum voltage required, typical operating current, full-load operating current, impedance, etc. But in a preferred embodiment the program that executes within the processor 8 is unaware of the characteristics of the motor 5 and learns the characteristics upon start-up, as will be later described.

The processor 8 and other circuitry are powered by a small power supply 28. Any known suitable power supply 28 is anticipated.

A solid state switch 12 is controlled by the processor 8 through a buffer/isolator 16. Solid state switches 12 are well known in the industry and are typically three-terminal devices having an input, output and trigger. Raising a voltage potential at the trigger above a threshold potential forces the solid state switch 12 into conduction. Since the solid state switch 12 is either in a high-impedance state (no power consumed) or conducting (only small amount of voltage is dropped between the input and output), very little power is lost (converted into heat) and only a small heat sink, or no heat sink at all, is needed. Solid state switches 12 typically consist of a power triac and possibly other circuitry related to the trigger such as buffers and isolation circuits.

Use of solid state switches 12 are well known in the industry. Such devices are often employed in lighting controls (e.g., dimmers) and other, often high-voltage systems. The solid state switches 12 (e.g. triac, silicon-controlled rectifiers, opposing-polarity silicon-controlled rectifiers, etc.), once triggered, continue to conduct until the current through them no longer flows. Once current stops flowing though the solid state switch 12, it resets back to a high-impedance state until it is triggered again. In many AC power controls (e.g. light dimmers), the trigger of the solid state switch 12 is phase controlled. For full brightness, the solid state switch 12 is triggered at the beginning of the AC cycle and since it latches until current abates, the solid state switch 12 continues to conduct for the remainder of the AC cycle. This is repeated at the beginning of the next cycle, etc. For reduced brightness, triggering of the solid state switch 12 is delayed by a trigger delay until somewhere partially into the cycle. For example, if delayed until half way into the cycle, approximately one-half of the total power is delivered to the load. The system 1 controls the load (motor 5) using the same principle. To deliver 50% of the total power to the motor 5, the trigger of the solid state switch 12 is fired (triggered) half way into the cycle, etc.

In order to determine the optimal trigger point for the solid state switch 12 based upon the load on the motor 5, the current through the motor 5 and solid state switch 12 is measured by a current sensor 10 and buffered and/or converted to digital by a current measurement circuit 14 as known in the art. For example, the current sensor 10 is a very low ohm resistor or hall-effect sensor and the current measurement circuit 14 is an isolator, amplifier and analog-to-digital converter, providing a digital value of the current to the processor 8. Many other circuits are known in the industry for measuring current and delivering that measurement to a processor 8, all of which are anticipated and included here within. Although shown as a processor-based system, non-processor based systems are also anticipated.

In order to determine the optimal trigger point for the solid state switch 12 and, hence, power delivered to the motor 5, another datum is needed: voltage. In this exemplary circuit, the voltage is measured, isolated and converted to digital by a voltage sense circuit 16. Many circuits are known in the industry for measuring voltage and delivering that measurement to a processor 8, all of which are anticipated and included here within.

Because, in some scenarios, the motor 5 is part of a system such as a washing machine, dryer, refrigerator, etc., and some such devices cannot operate below a certain RMS (root-mean-square) line voltage, an RMS circuit 22 is included in the preferred embodiment to measure the effective RMS voltage at the load (motor 5) and to relay that measurement to the processor 8.

In some embodiments, one or more indicators 26 are provided to indicate operating states such as normal operation, start-up and overload, etc. Such indicators 26 are, for example, LEDS 26 or other display devices and are driven, either directly or through a buffer by the processor 8.

Figure 2:
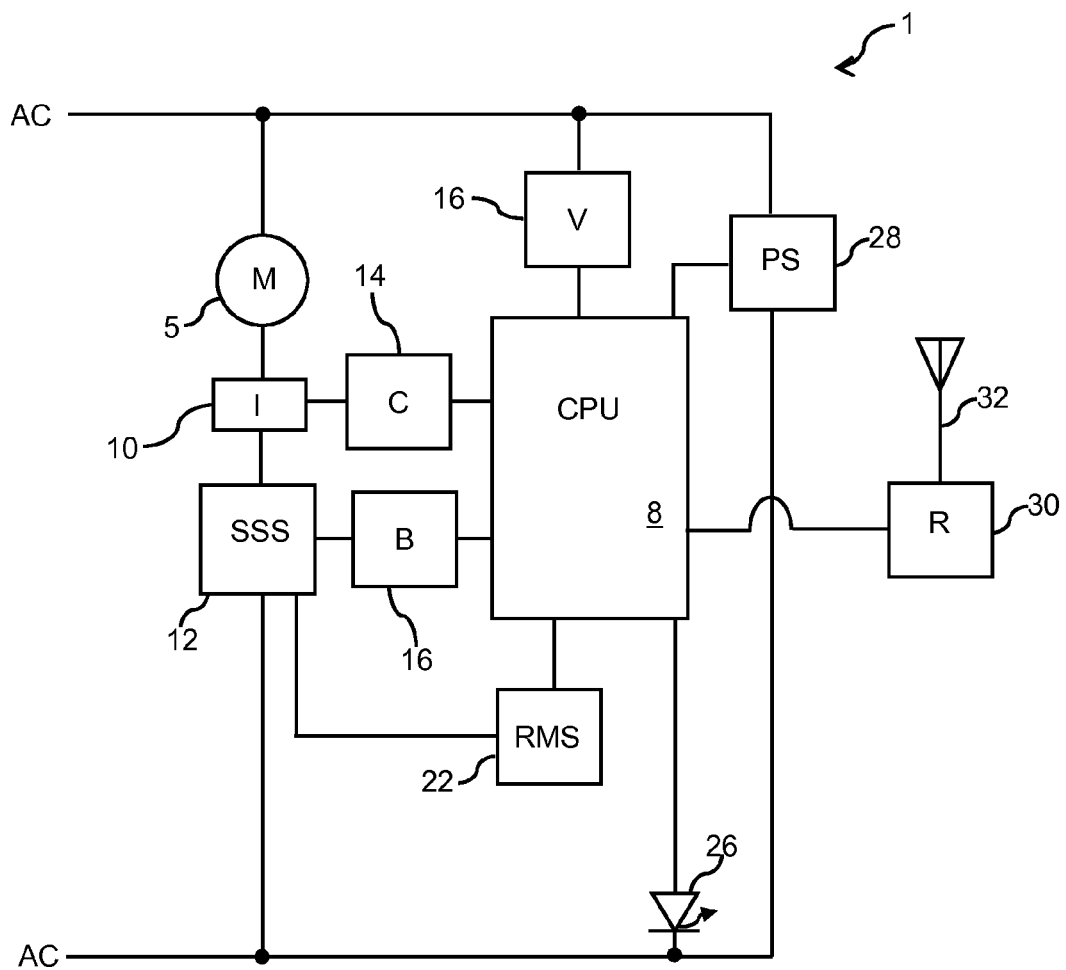
FIG. 2 illustrates a schematic view of a system for controlling the single-phase motor with telemetry.

Referring to FIG. 2, a schematic view of a system 1 for controlling a single-phase motor with telemetry is shown. This motor control 1 is similar to that described in FIG. 1 with the addition of an optional radio 30 and antenna 32. The processor 8 has a program that executes to: read inputs from other components in the system, outputs for controlling other components in the system, and signaling status and/or accepting control from a remote site through the radio 30 and antenna 32. For example, if an overload condition is detected, the processor 8 signals a remote site of the situation through the radio 30 and antenna 32. In another example, the remote site signals the processor 8 to shut down the motor 5 or delay start-up of the motor. The radio 30 and antenna 32 are any known radio 30 and antenna 32 having transmit, receive or transceiver capabilities, for example a WiFi (802.11) transceiver, a Bluetooth transceiver, etc. By networking several control systems, a wide-area power system is envisioned in which a central authority determines when the various controls start their motors. In embodiments having only a radio receiver, the external site is capable of sending signals to initiate operations of the system for controlling a single-phase motor 5 but acknowledgements and/or status are not transmitted back to the external site. In embodiments having only a radio transmitter, the system for controlling a single-phase motor 1 transmits status to the external site but there is no provision for the external site to send signals to control operations of the system for controlling a single-phase motor 5.

As an example, in a large building without such controls, after return of power following a power failure, most motors start immediately when power is restored. In the same building with the disclosed control system, a central control system communicates with individual motor control systems to stagger starting of individual motors so as to not overload the power grid when it is restored. This is important because motors consume a greater amount of power on start as compared to normal run power consumption.

Figure 3:
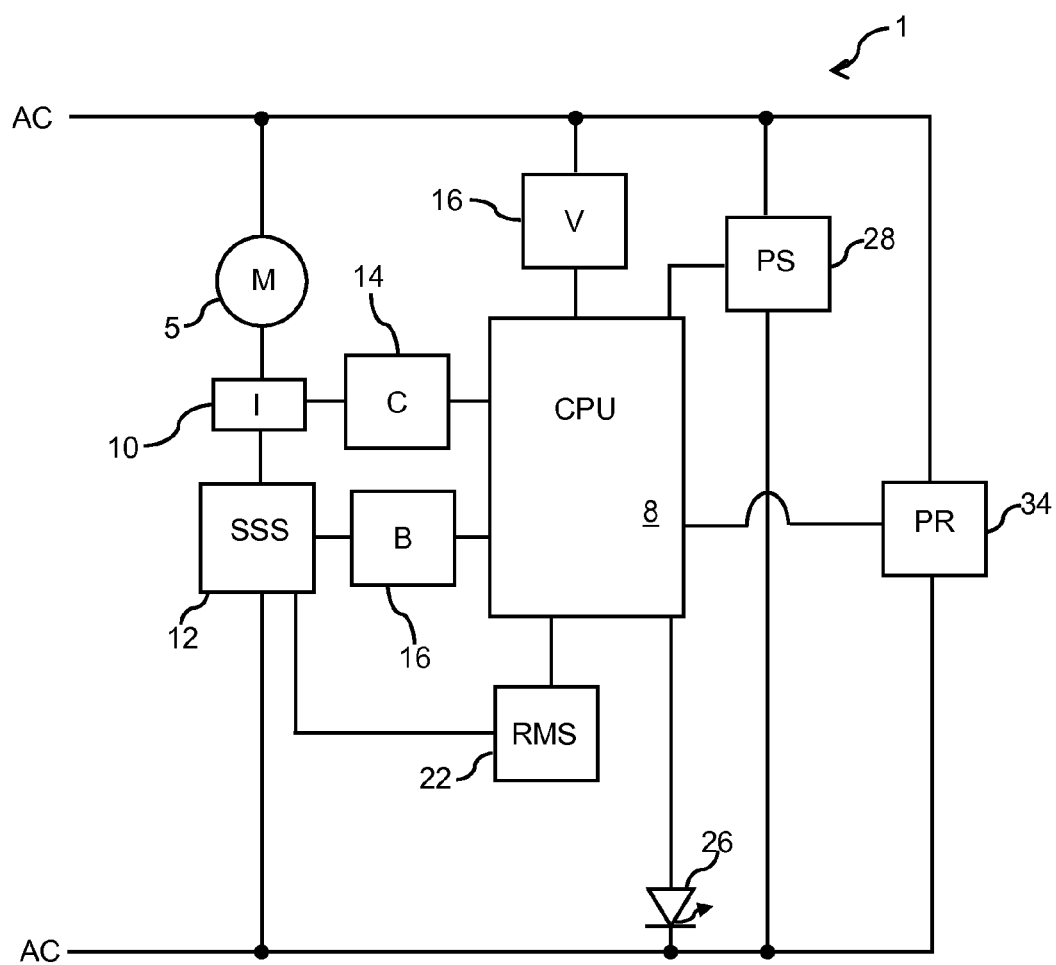
FIG. 3 illustrates a schematic view of a system for controlling the single-phase motor with power-line networking.

Referring to FIG. 3, a schematic view of a system for controlling a single-phase motor 1 with networking is shown. This motor control 1 is similar to that described in FIGS. 1 and 2 with the addition of an optional network interface 34. The processor 8 has a program which executes to read inputs from other components in the system and outputs for controlling other components in the system and signaling status and/or accepting control from a remote site through the network interface 34. For example, if an overload condition is detected, the processor 8 signals a remote site of the situation through the network interface 34. In another example, the remote site signals the processor 8 to shut down the motor 5 or delay start-up of the motor.

The network interface is any known network interface having transceiver capabilities, for example Ethernet, RS-232, Home Power Line Networking, etc. By networking several control systems, a wide-area power system is envisioned in which a central authority determines when the various controls start their motors. The external site is capable of sending signals to initiate operations of the system for controlling a single-phase motor 1 and for receiving status. As an example, in a large building without such controls, after return of power after a failure, most motors start immediately. In the same building with the disclosed network-based control system, a central control system communicates with individual motor control systems to stagger starting of individual motors so as to not overload the power grid when it is restored. An overload could occur because motors consume a greater amount of power on start as compared to normal run power consumption.

Figure 4:
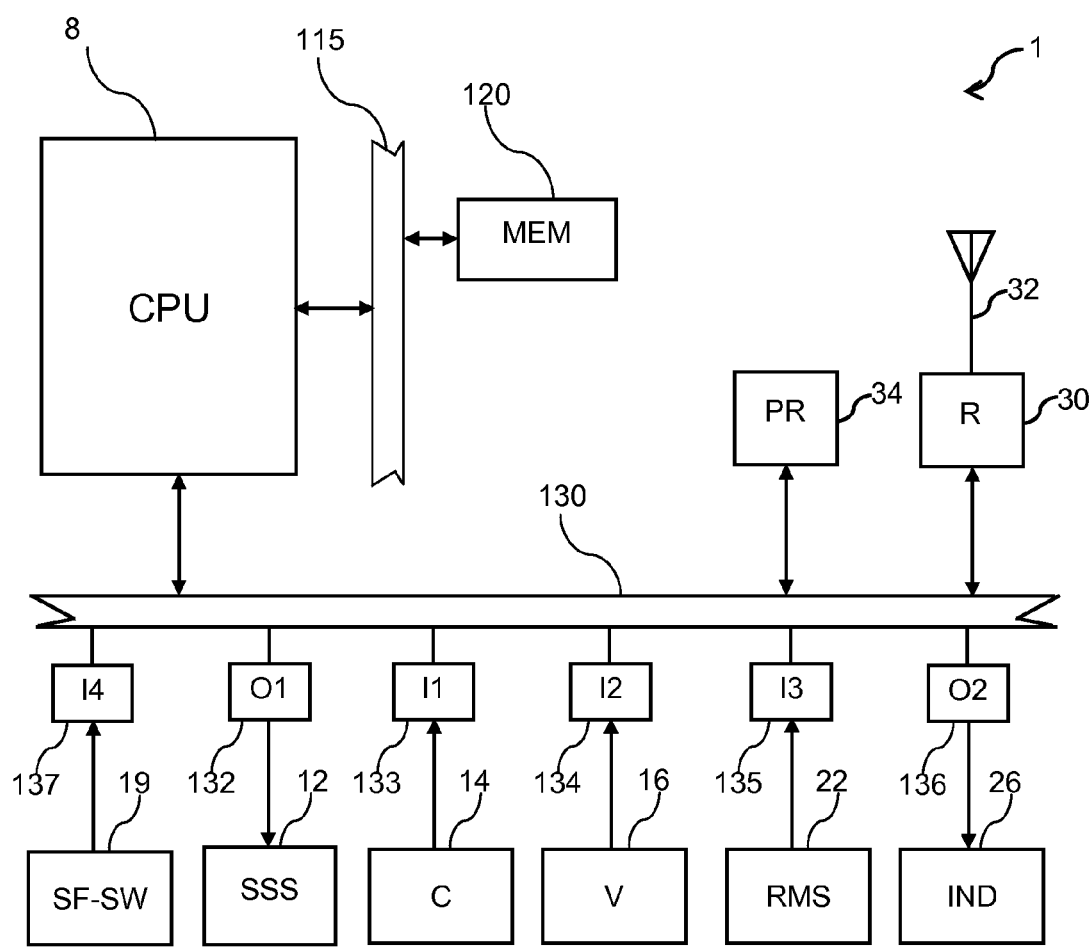
FIG. 4 illustrates a schematic view of a processor system for controlling the single-phase motor.

Referring to FIG. 4, a schematic view of an exemplary processor system for controlling the single-phase motor is shown. In this, the processor 8 interfaces to memory 120 through a memory bus 115. Any type of memory 120 and/or interconnection with the processor 8 is anticipated. In some systems, the memory consists of persistent memory for instruction/program storage and read/write memory for storing data. There are many known processor/memory systems and the system described is but one example, many of which are anticipated for use in a motor controlling system 1. In some exemplary processing systems, the processor has input/output ports, generally connected to the processor through a bus 130 or other means as known in the industry. In this example, the input and/or output ports 132/133/134/135/136/137 read the status of input switches 19 (e.g. an optional reset switch), control the solid state switch 12, read the current 14, read the voltage 16, read the RMS voltage 22 and control the (optional) illumination device 26. Likewise, in embodiments having a radio 30 and antenna 32, the radio 30 interfaces with the processor as known in the industry, for example through the bus 130. Some embodiments have a selector switch 19 composed of one or more "dip switches" used for configuring the system. For example, one such switch 19, when present, enables or disables restarting the motor in a fixed amount of time after an over current situation was detected, and the motor was shut down.

Figure 5:
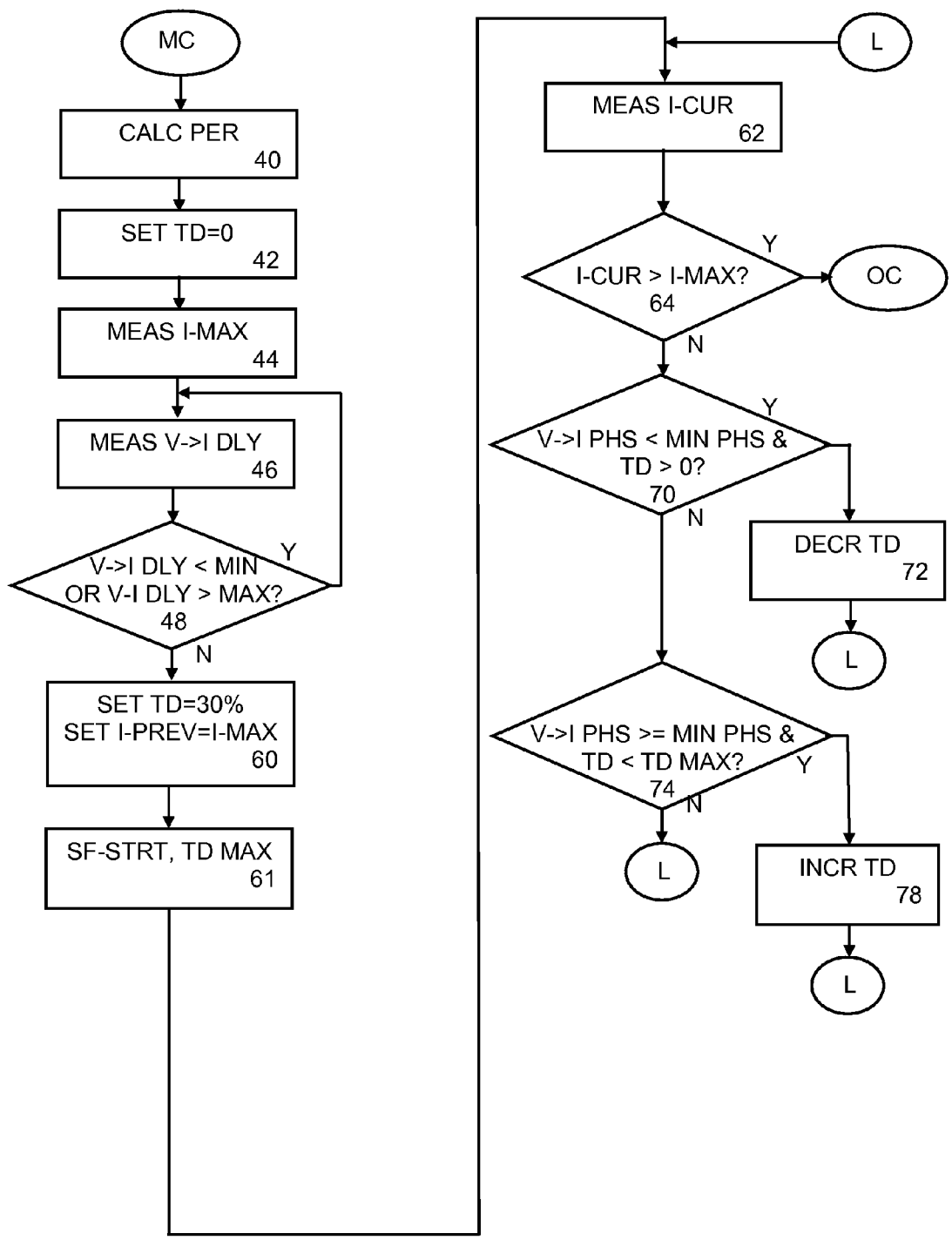
FIG. 5 illustrates a first flow chart of the system for controlling the single-phase motor.

Referring to FIG. 5, a flow chart of the operation of a typical program running in the processor 8 is described. An important aspect of power consumption in induction motors 5 is power factor. In the industry, the real power, P, is measured in watts and the apparent power, S, is measured in volt-amperes. Since induction motors 5 are inductive loads to a sinusoidal AC voltage, the current wave form lags the voltage waveform by a delay proportional to the frequency of the AC voltage and the inductance of the induction motor 5. As an illustration, for a known AC voltage frequency (e.g. 60 Hz), the lag between the AC voltage sine wave and the AC current sine wave increases as inductance of the motor increases. It is well known that the inductance of an induction motor increases as load on the motor increases. The real power, P, is the power actually delivered to the motor 5. The real power is equal to the apparent power, S, times the cosine of the phase angle. Therefore, the power factor is a number between zero and one. If the power factor is one, the real power is equal to the apparent power and optimal efficiency is achieved. This never occurs with induction motors 5.

When power is first applied to the system 1, the processor captures initial data from the current measurement circuit 14 and the voltage sense circuit 16. Before applying power to the controlled device (e.g. triggering the solid state switch 12), the power line frequency is measured 40 through the voltage sense circuit 16 by, for example, measuring the number of zero-crossings in a time period (e.g. 60 in one second would correlate to 60 Hz) or counting the number of internal clock ticks between zero crossings. For example, a timer that triggers every 30 microseconds will trigger approximately 277 times between zero crossings of a 60 Hz AC signal.

Power to the load is controlled by delaying firing of the solid state switch by a percentage of the period of the AC voltage. This controlled delay is called a trigger delay. The previously determined power line frequency is used to calibrate the trigger delay. For example, in the scenario above in which a 30 microsecond timer triggers approximately 277 times between zero crossings, to provide 50% power to the load (e.g. motor 5), the trigger delay is set to 50% or approximately ½ of the 277 timer intervals. Accordingly, the trigger is fired at approximately 138 timer intervals after the zero crossing of the voltage.

Another step in controlling the motor 5 is to make measurements to determine characteristics of the load (e.g. motor 5). In the system for controlling a single-phase motor 1, maximum voltage/power is applied to the load (e.g. motor 5) by setting the trigger delay (TD) to zero 42. This initiates triggering of the solid state switch at the zero crossing, thereby providing full power to the load (e.g. motor 5). While full power is provided to the load, the maximum current (inrush current) is measured 44. Since the motor 5 is not turning, the current is very similar to the current anticipated with a stalled motor. The inrush current is saved as an over-current threshold (I-MAX) 44 and used later to determine if the motor has been overloaded (e.g. stalled) during operation.

Next, it is determined if a resistive load or an inductive load is present. An induction motor 5 typically operates in a range of voltage-to-current phase angles, depending upon the construction of the motor 5 and the load on the motor 5. If a resistive load is present, the voltage-to-current phase angle is approximately zero since there is no inductance in the load. This determination is complicated by the fact that typical non-induction motor loads do have some amount of inductance due to transformers and other circuitry, in addition to some capacitance load. To determine if an inductive load is present (e.g., the inductive load of an induction motor 5), the voltage-to-current phase angle is measured 46 by measuring the delay between the zero crossing of the voltage and the zero crossing of the current (V->I delay).

To determine the type of load, two phase angle threshold values are used. If the zero-crossing of the current occurs within a minimum phase difference value (MIN) of the zero-crossing of the voltage 48 or if the zero-crossing of the current occurs after a maximum phase difference value (MAX) of the zero-crossing of the voltage 48 then it is determined that a non-inductive or resistive load is being controlled. In the preferred embodiment, the minimum phase difference value (MIN) is 15 degrees of the duty cycle (approximately 8.3% of the duty cycle) and the maximum phase difference value (MAX) is 90 degrees of the duty cycle (approximately 50% of the duty cycle). In this, it is determined that an induction motor 5 is the load if the voltage-to-current lag is between 15 degrees and 90 degrees of the duty cycle. In alternate embodiments, other ranges are anticipated, such as the determination that an induction motor 5 is the load if the voltage-to-current lag is between 20 degrees and 85 degrees of the duty cycle.

If it is determined that the load is not an induction motor 5, full power is maintained (e.g. TD remains at zero) throughout the operation 46/48 until a phase difference between the voltage and the current 48 falls between the MIN/MAX range. Such a shift in phase occurs, for example, in a device that has an intermittently operated motor such as a refrigerator in which the compressor motor only operates when the temperature within the refrigerator is above a preset value.

As discussed prior, power to the load is varied by delaying firing of the solid state switch by a percentage of the period of the AC voltage, called a trigger delay (TD). Once the type of load and over-current point is measured, the trigger delay is initialized 60 to a value that provides less-than full power, for example 30% less or, for a 120 VAC system, around 40 Volts RMS lower than nominal power. This nominal value of 30% is the preferred but, in other embodiments, the nominal value is of the range of 20% to 40%. In some embodiments, sampling is performed to determine if any load is connected by sending short voltage pulses while measuring the current. In this, the solid state switch is initially controlled to fire at approximately 30% of the period, thereby providing enough power to start an induction motor. For example, with 60 Hz AC power, the period is approximately 8.33 ms and the solid state switch is triggered at approximately 2.8 ms from the zero crossing. The measured current (I-MAX) is saved (I-PREV) 60 for later comparison. In other embodiments, the trigger delay is set to another value other than 30%. For example, in systems that don't provide a "soft start," the trigger delay is set 60 to 0%. In some embodiments, sampling is performed to determine if any load is connected by sending short voltage pulses while measuring the current.

Next, the motor is slowly started by gradually increasing the voltage/power to the motor 61. The maximum allowable trigger delay is also determined 61. This is detailed in FIGS. 9 and 10. In this, the power to the motor 5 is gradually increased and, at each step, the current drawn by the motor 5 is measured and compared to the previous current drawn by the motor 5. Once the current decreases, the system has found the inrush current of the motor 5, which is used to set operating boundaries (see FIGS. 9 and 10). After the boundaries are established, the phase difference between the phase of the voltage and the phase of the current to the motor 5 are used to control the power to the motor 5 (e.g. trigger delay) as will be described.

Figure 8:
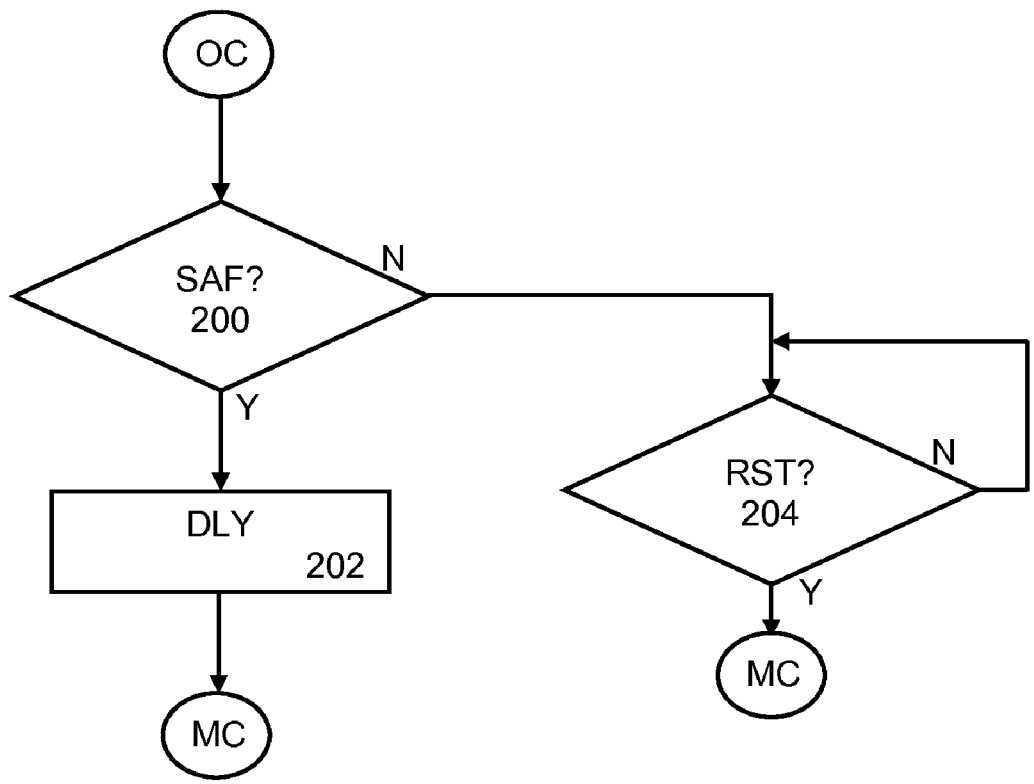
FIG. 8 illustrates a fourth flow chart of the system for controlling the single-phase motor.

Now the system enters a loop, measuring absolute current of the load (I-CUR) 62 and, if the absolute current (I-CUR) is greater than the over-current value (I-MAX) 64 previously stored, an over-current condition is detected and future firing of the solid state switch is prevented until a reset signal is detected or a timer expires (See FIG. 8). In some situations, it is not advised to use a reset timer such as in systems where the motor controls mechanics that are accessible to an operator since this provides the potential to harm the operator when the timer expires and the motor is restarted.

Next, within the loop, the present phase difference between the voltage and the current is measured and if the phase difference is less than the minimum phase difference and the trigger delay is greater than zero 70, the trigger delay is decremented 72, thereby increasing voltage/power to the motor 5. If the present phase difference between the voltage and the current is greater or equal to the minimum phase difference and the trigger delay is less than the maximum trigger delay 74, the trigger delay is incremented 78, thereby decreasing voltage/power to the motor 5.

An example of this operation is as follows. Once the over-current value is determined, the trigger delay is set to, for example, 30% and the motor is started. During start-up, the motor's internal centrifugal switch is closed, thereby engaging the motor's starting windings to start the motor from an idle, zero RPM state. The first current reading from the motor will be the highest, because the motor is stalled and the centrifugal switch is closed. The next few readings are most likely to be a similar current and, therefore, the trigger delay remains at 30%. Once the stator of the motor begins to turn, the current begins to decrease. Responsive to this, the trigger delay is incremented until an ideal trigger delay is detected in which further incrementing of the trigger delay no longer reduces current. When the motor reaches operational speed, the centrifugal switch opens and current to the motor decreases, at which time, the trigger delay is incremented until a new, optimal trigger delay is determined, providing maximum efficiency. Now, if additional load is placed on the motor (e.g. an object is pushed against a saw blade or a weight is placed on an escalator, etc.), the present current reading becomes higher than the previous current reading and the trigger delay is decreased until a new optimal trigger delay is determined. Then, when the load abates (e.g. the saw operation ends or the weight leaves the escalator), the present current becomes less than the previous current and the trigger delay is increased until a new optimal trigger delay is again determined.

To determine the power factor, the phase of the voltage is compared to the phase of the current. The phase the voltage is in sync with the zero-crossing of the voltage. Therefore, the processor 8 read the instantaneous voltage of the AC voltage from the voltage sense circuit 16 to determine when the voltage is zero, meaning a zero crossing has occurred. Similarly, the phase of the current is in sync with the zero-crossing of the current. The processor 8 read the instantaneous current from the current sense circuit 14 to determine when the current is zero, meaning a zero crossing has occurred. The phase difference between the voltage and the current is calculated, for example, as the time from the zero crossing of the voltage until the zero crossing of the current divided by the half-cycle period times 180 degrees. For example, if the half-cycle period is 8.33 ms (as in 60 Hz) and the time from the zero crossing of the voltage until the zero crossing of the current is 4.17 ms, then the phase difference is (8.33/4.17)*180 or 90 degrees.

Figure 6:
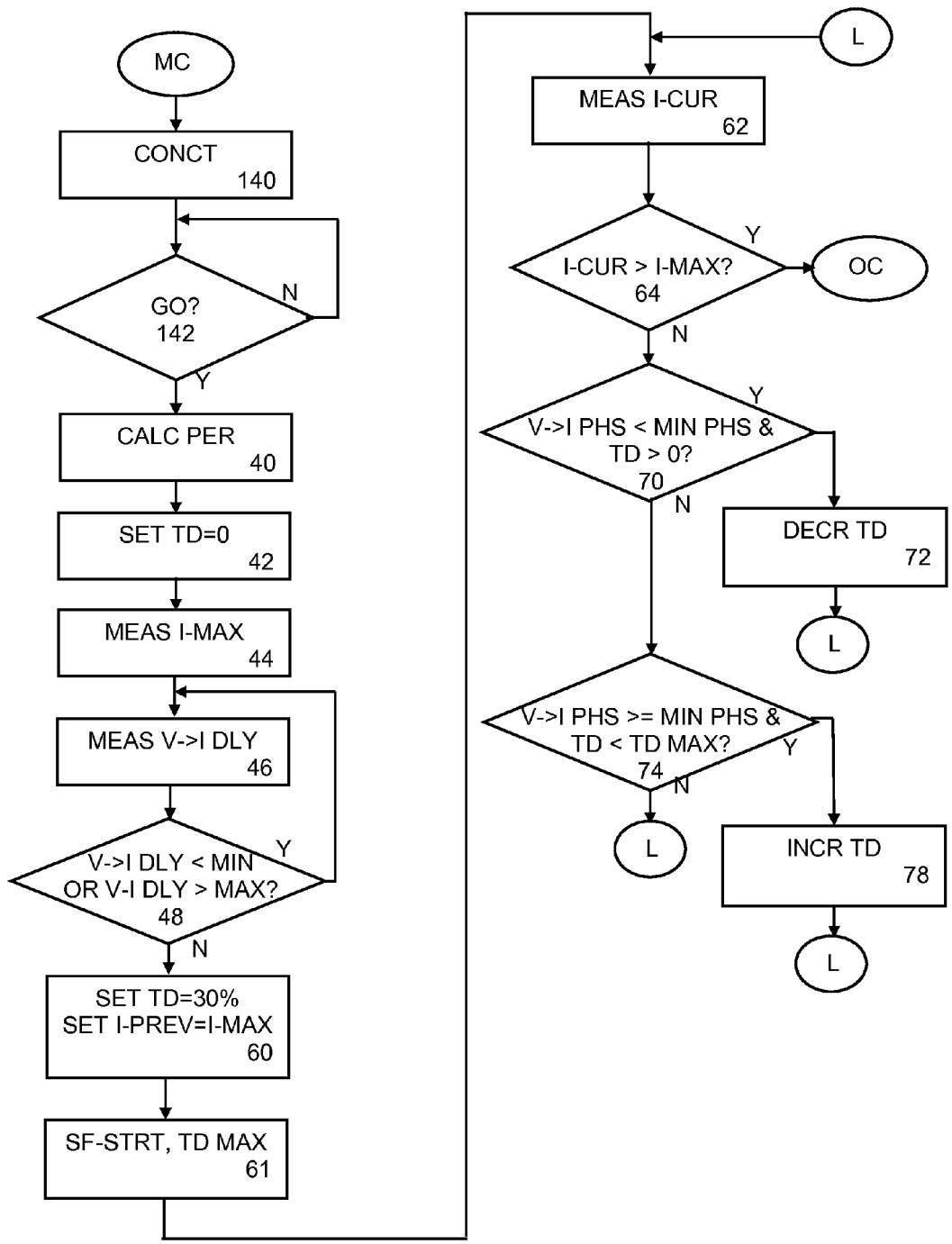
FIG. 6 illustrates a second flow chart of the system for controlling the single-phase motor.

Referring to FIG. 6, a second flow chart of the operation of a typical program running in the processor 8 is described.

In this example, the system is under control of a remote authority.

When power is first applied to the system 1, the processor 8 initiates a connection to the remote authority (not shown) 140. For example, in systems that include a radio receiver 30, the processor 8 waits until, for example, a carrier signal is detected. Another example, in systems that include a network adapter 34, the processor 8 initiates a connection to the remote authority through the network adapter 34, or waits for a connection initiated by the remote authority through the network adapter, as known in the industry. It is also anticipated that the signaling between the processor 8 and the remote authority be over a connectionless protocol or any other protocol known in the industry.

Although it is anticipated that having connectivity to a remote authority provides signaling to start motor operation, other signaling is also anticipated such as status reporting (e.g. power consumed by the motor) and programming or changing of operating parameters, etc.

Once the connection is established, the processor 8 waits for a signal from the remote authority before starting the motor 5. For example, in systems that include a radio receiver 30, the processor 8 waits 142 until, for example, a specific modulation of the carrier signal is detected. Another example, in systems that include a network adapter 34, the processor 8 waits for a packet containing a start-up command sequence, received through the network adapter 34, as known in the industry.

Once signaled to start 142 the motor 5, the processor captures initial data from the current measurement circuit 14 and the voltage sense circuit 16. Before applying power to the controlled device (e.g. triggering the solid state switch 12), the power line frequency is measured 40 through the voltage sense circuit 16 by, for example, measuring the number of zero-crossings in a time period (e.g. 60 in one second would correlate to 60 Hz) or counting the number of internal clock ticks between zero crossings. For example, a timer that triggers every 30 microseconds will trigger approximately 277 times between zero crossings of a 60 Hz AC signal.

In this embodiment of the system for controlling a single-phase motor 1, maximum voltage/power is applied to the load (e.g. motor 5) by setting the trigger delay (TD) to zero 42. This initiates triggering of the solid state switch at the zero crossing, thereby providing full power to the load (e.g. motor 5). While full power is provided to the load, the maximum current (inrush current) is measured 44. Since the motor 5 is not turning, the current is very similar to the current anticipated with a stalled motor. The inrush current is saved as an over-current threshold (I-MAX) 44 and used later to determine if the motor has been overloaded (e.g. stalled) during operation.

Next, it is determined if a resistive load or an inductive load is present. An induction motor 5 typically operates in a range of voltage-to-current phase angles, depending upon the construction of the motor 5 and the load on the motor 5. If a resistive load is present, the voltage-to-current phase angle is approximately zero since there is no inductance in the load. Typical non-induction motor loads do have some amount of inductance due to transformers and other circuitry, as well as some capacitance load as well. To determine if an inductive load is present (e.g., the inductive load of an induction motor 5), the voltage-to-current phase angle is measured 46 by measuring the delay between the zero crossing of the voltage and the zero crossing of the current 46 (V->I delay).

To determine the type of load, two phase angle threshold values are used. If the zero-crossing of the current occurs within a minimum phase difference value (MIN) of the zero-crossing of the voltage 48 or if the zero-crossing of the current occurs after a maximum phase difference value (MAX) of the zero-crossing of the voltage 48 then it is determined that a non-inductive or resistive load is being controlled. In the preferred embodiment, the minimum phase difference value (MIN) is 15 degrees of the duty cycle (approximately 8.3% of the duty cycle) and the maximum phase difference value (MAX) is 90 degrees of the duty cycle (approximately 50% of the duty cycle). In this, it is determined that an induction motor 5 is the load if the voltage-to-current lag is between 15 degrees and 90 degrees of the duty cycle. In alternate embodiments, other ranges are anticipated such as determining that an induction motor 5 is the load if the voltage-to-current lag is between 20 degrees and 85 degrees of the duty cycle.

If it is determined that the load is not an induction motor 5, full power is maintained (e.g. TD remains at zero) throughout the operation 46/48 until a phase difference between the voltage and the current 48 falls between the MIN/MAX range. Such a shift in phase occurs, for example, in a device that has an intermittently operated motor such as a refrigerator in which the compressor motor only operates when the temperature within the refrigerator is above a preset value.

As discussed prior, power to the load is varied by delaying firing of the solid state switch by a percentage of the period of the AC voltage, called a trigger delay (TD). Once the type of load and over-current point is measured, the trigger delay is initialized 60 to a value that provides less-than full power, for example 30% less or, for a 120 VAC system, around 40 Volts RMS lower than nominal power. This nominal value of 30% is the preferred but, in other embodiments, the nominal value is within the range of 20% to 40%. In this, the solid state switch is initially controlled to fire at approximately 30% of the period, thereby providing enough power to start an induction motor. For example, with a 60 Hz AC power, the period is approximately 8.33 ms and the solid state switch is triggered at approximately 2.8 ms from the zero crossing. The measured current (I-MAX) is saved (I-PREV) 60 for later comparison. In other embodiments, the trigger delay is set to another value other than 30%. For example, in systems that do not provide a "soft start," the trigger delay is set 60 to 0%.

Next, the motor is slowly started by gradually increasing the voltage/power to the motor 61. The maximum allowable trigger delay is also determined 61. This is detailed in FIGS. 9 and 10. In this, the power to the motor 5 is gradually increased and, at each step, the current drawn by the motor 5 is measured and compared to the previous current drawn by the motor 5. Once the current decreases, the system has found the inrush current of the motor 5, which is used to set operating boundaries (see FIGS. 9 and 10). After the boundaries are established, the phase difference between the phase of the voltage and the phase of the current to the motor 5 are used to control the power to the motor 5 (e.g. trigger delay) as will be described.

Now the system enters a loop, measuring absolute current of the load (I-CUR) 62 and, if the absolute current (I-CUR) is greater than the over-current value (I-MAX) 64 previously stored, an over-current condition is detected and future firing of the solid state switch is prevented until a reset signal is detected or a timer expires (See FIG. 8). In some situations, it is not advised to use a reset timer such as in systems where the motor controls mechanics that are accessible to an operator since this provides the potential to harm the operator when the timer expires and the motor is restarted.

Next, within the loop, the present phase difference between the voltage and the current is measured. If the phase difference is less than the minimum phase difference and the trigger delay is greater than zero 70, the trigger delay is decremented 72, thereby increasing voltage/power to the motor 5. If the present phase difference between the voltage and the current is greater or equal to the minimum phase difference and the trigger delay is less than the maximum trigger delay 74, the trigger delay is incremented 78, thereby decreasing voltage/power to the motor 5.

An example of this operation is as follows. Once the over-current value is determined, the trigger delay is set to, for example, 30% and the motor is started. During start-up, the motor's internal centrifugal switch is closed, thereby engaging the motor's starting windings to start the motor from an idle, zero RPM state. The first current reading from the motor will be the highest, because the motor is stalled and the centrifugal switch is closed. The next few readings are most likely to be a similar current and, therefore, the trigger delay remains at 30%. Once the stator of the motor begins to turn, the current begins to decrease. Responding to this, the trigger delay is incremented until an ideal trigger delay is detected at which point further incrementing of the trigger delay no longer reduces current. When the motor reaches operational speed, the centrifugal switch opens and current to the motor decreases, at which time, the trigger delay is incremented until a new, optimal trigger delay is determined, providing maximum efficiency. Now, if additional load is placed on the motor (e.g. an object is pushed against a saw blade or a weight is placed on an escalator, etc.), the present current reading is higher than the previous current reading and the trigger delay is decreased until a new optimal trigger delay is determined. Then, when the load abates (e.g. the saw operation ends or the weight leaves the escalator), the present current reading becomes less than the previous current reading and the trigger delay is increased until a new optimal trigger delay is again determined.

To determine the power factor, the phase of the voltage is compared to the phase of the current. The phase of the voltage is in sync with the zero-crossing of the voltage.

Therefore, the processor 8 read the instantaneous voltage of the AC voltage from the voltage sense circuit 16 to determine when the voltage is zero, meaning a zero crossing has occurred. Similarly, the phase of the current is in sync with the zero-crossing of the current. The processor 8 reads the instantaneous current from the current sense circuit 14 to determine when the current is zero, meaning a zero crossing has occurred. The phase difference between the voltage and the current is calculated, for example, as the time from the zero crossing of the voltage until the zero crossing of the current divided by the half-cycle period times 180 degrees. For example, if the half-cycle period is 8.33 ms (as in 60 Hz) and the time from the zero crossing of the voltage until the zero crossing of the current is 4.17 ms, then the phase difference is (8.33/4.17)*180 or 90 degrees.

Figure 7:
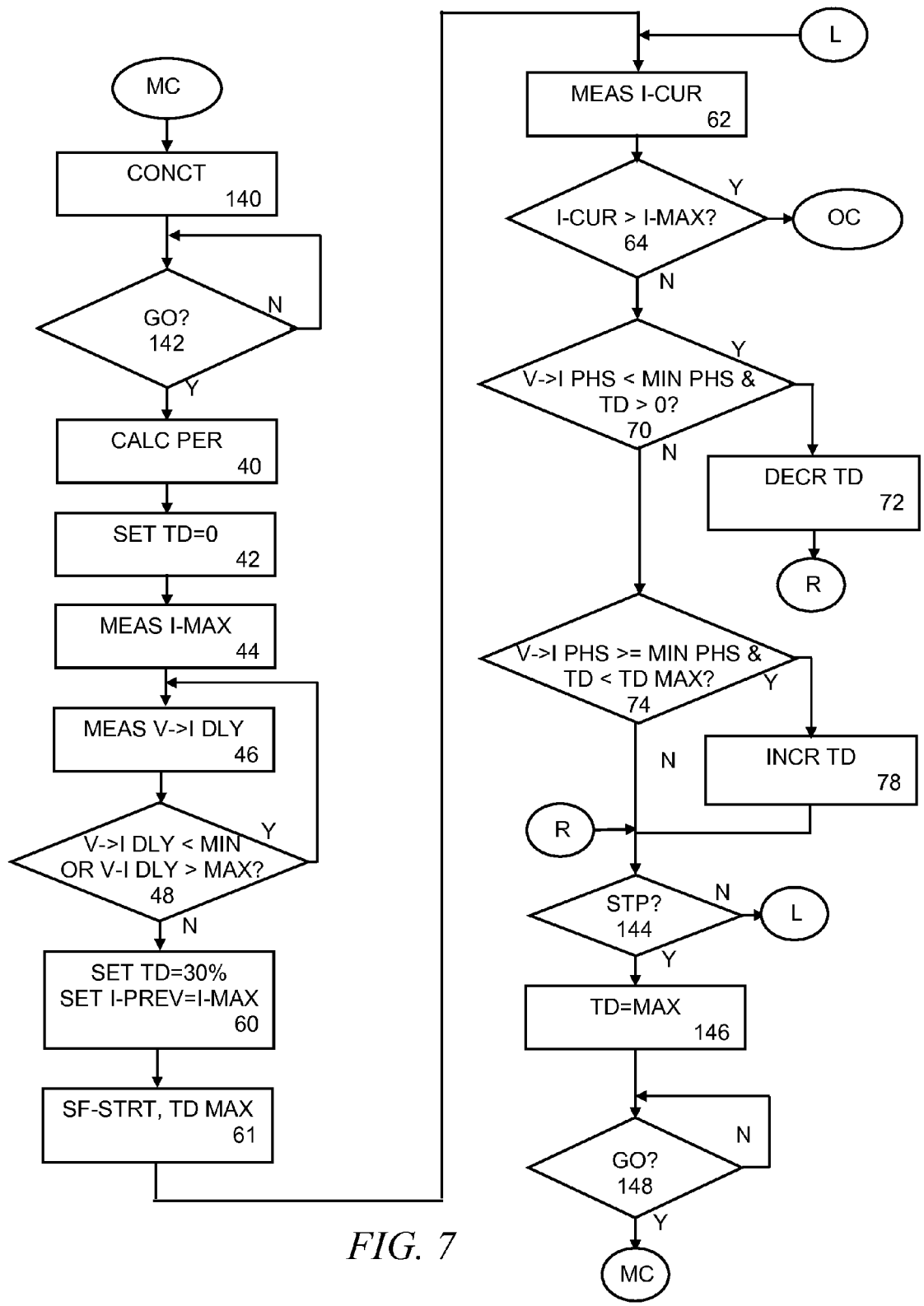
FIG. 7 illustrates a third flow chart of the system for controlling the single-phase motor.

Referring to FIG. 7, a third flow chart of the operation of a typical program running in the processor 8 is described. In this example, the system is under the control of a remote authority.

When power is first applied to the system 1, the processor 8 initiates a connection to the remote authority (not shown) 140. For example, in systems that include a radio receiver 30, the processor 8 waits until, for example, a carrier signal is detected. In another example, in systems that include a network adapter 34, the processor 8 initiates a connection to the remote authority through the network adapter 34, as known in the industry. It is also anticipated that the signaling between the processor 8 and the remote authority be over a connectionless protocol or any other protocol known in the industry.

Although having connectivity to a remote authority that provides signaling to start motor operation is anticipated, other signaling is also anticipated such as status reporting (e.g. power consumed by the motor) and programming or changing of operating parameters, etc.

Once the connection is established, the processor captures initial data from the current measurement circuit 14 and the voltage sense circuit 16. Before applying power to the controlled device (e.g. triggering the solid state switch 12), the power line frequency is measured 40 through the voltage sense circuit 16 by, for example, measuring the number of zero-crossings in a time period (e.g. 60 in one second would correlate to 60 Hz) or counting the number of internal clock ticks between zero crossings. For example, a timer that triggers every 30 microseconds will trigger approximately 277 times between zero crossings of a 60 Hz AC signal.

Power to the load is controlled by delaying firing of the solid state switch by a percentage of the period of the AC voltage, called a trigger delay. For example, in the scenario above in which a 30 microsecond timer triggers approximately 277 times between zero crossings, to provide 50% power to the load (e.g. motor 5), the trigger delay is set to 50% or approximately ½ of the 277 timer intervals so the trigger is fired at approximately 138 timer intervals after the zero crossing of the voltage.

Another step in controlling the motor 5 is to make measurements to determine characteristics of the load (e.g. motor 5). In the system for controlling a single-phase motor 1, maximum voltage/power is applied to the load (e.g. motor 5) by setting the trigger delay (TD) to zero 42. This initiates triggering of the solid state switch at the zero crossing, thereby providing full power to the load (e.g. motor 5). While full power is provided to the load, the maximum current (inrush current) is measured 44. Since the motor 5 is not turning, the current is very similar to the current anticipated with a stalled motor. The inrush current is saved as an overcurrent threshold (I-MAX) 44 and used later to determine if the motor has been overloaded (e.g. stalled) during operation.

Next, it is determined if a resistive load or an inductive load is present. An induction motor 5 typically operates in a range of voltage-to-current phase angles, depending upon the construction of the motor 5 and the load on the motor 5. If a resistive load is present, the voltage-to-current phase angle is approximately zero since there is no inductance in the load. Typical non-induction motor loads do have some amount of inductance due to transformers and other circuitry, as well as some capacitance load. To determine if an inductive load is present (e.g., the inductive load of an induction motor 5), the voltage-to-current phase angle is measured 46 by measuring the delay between the zero crossing of the voltage and the zero crossing of the current 46 (V->I delay).

To determine the type of load, two phase angle threshold values are used. If the zero-crossing of the current occurs within a minimum phase difference value (MIN) of the zero-crossing of the voltage 48 or if the zero-crossing of the current occurs after a maximum phase difference value (MAX) of the zero-crossing of the voltage 48 then it is determined that a non-inductive or resistive load is being controlled. In the preferred embodiment, the minimum phase difference value (MIN) is 15 degrees of the duty cycle (approximately 8.3% of the duty cycle) and the maximum phase difference value (MAX) is 90 degrees of the duty cycle (approximately 50% of the duty cycle). In this, it is determined that an induction motor 5 is the load if the voltage-to-current lag is between 15 degrees and 90 degrees of the duty cycle. In alternate embodiments, other ranges are anticipated such as the determination that an induction motor 5 is the load if the voltage-to-current lag is between 20 degrees and 85 degrees of the duty cycle.

If it is determined that the load is not an induction motor 5, full power is maintained (e.g. TD remains at zero) throughout the operation 46/48 until a phase difference between the voltage and the current 48 falls between the MIN/MAX range. Such a shift in phase occurs, for example, in a device that has an intermittently operated motor such as a refrigerator in which the compressor motor only operates when the temperature within the refrigerator is above a preset value.

As discussed prior, power to the load is varied by delaying firing of the solid state switch by a percentage of the period of the AC voltage, called a trigger delay (TD). Once the type of load and over-current point is measured, the trigger delay is initialized 60 to a value that provides less-than full power, for example 30% less or, for a 120 VAC system, around 40 Volts RMS lower than nominal power. This nominal value of 30% is the preferred but, in other embodiments, the nominal value is of the range of 20% to 40%. In this, the solid state switch is initially controlled to fire at approximately 30% of the period, thereby providing enough power to start an induction motor. For example, with a 60 Hz AC power, the period is approximately 8.33 ms and the solid state switch is triggered at approximately 2.8 ms from the zero crossing. The measured current (I-MAX) is saved (I-PREV) 60 for later comparison. In other embodiments, the trigger delay is set to another value other than 30%. For example, in systems that don't provide a "soft start," the trigger delay is set 60 to 0%.

Next, the motor is slowly started by gradually increasing the voltage/power to the motor 61. The maximum allowable trigger delay is also determined 61. This is detailed in FIGS. 9 and 10. In this, the power to the motor 5 is gradually increased and, at each step, the current drawn by the motor 5 is measured and compared to the previous current drawn by the motor 5. Once the current decreases, the system has found the inrush current of the motor 5, which is used to set operating boundaries (see FIGS. 9 and 10). After the boundaries are established, the phase difference between the phase of the voltage and the phase of the current to the motor 5 are used to control the power to the motor 5 (e.g. trigger delay) as will be described.

Now the system enters a loop, measuring absolute current of the load (I-CUR) 62 and, if the absolute current (I-CUR) is greater than the over-current value (I-MAX) 64 previously stored, an over-current condition is detected and future firing of the solid state switch is prevented until a reset signal is detected or a timer expires (See FIG. 8). In some situations, it is not advised to use a reset timer such as in systems where the motor controls mechanics that are accessible to an operator since this provides the potential to harm the operator when the timer expires and the motor is restarted.

Next, within the loop, the present phase difference between the voltage and the current is measured and if the phase difference is less than the minimum phase difference and the trigger delay is greater than zero 70, the trigger delay is decremented 74, thereby increasing voltage/power to the motor 5. If the present phase difference between the voltage and the current is greater or equal to the minimum phase difference and the trigger delay is less than the maximum trigger delay 74, the trigger delay is incremented 78, thereby decreasing voltage/power to the motor 5.

Before the loop is repeated, the remote authority is checked to see if a "stop motor" signal (or other command/control signal) is received 144. If there is no signal 144, the loop continues 62/64/70/72/76/78/144. If a signal was received 144, action is taken such as entering another loop 146 waiting for a signal to restart the motor. In this example, a stop command is detected and the trigger delay is set to a maximum value 146, thereby disabling triggering of the solid state switch 12 and stopping the motor until another signal is received 148 from the remote authority signaling a restart, at which time the motor 5 is restarted 140-148.

The decrement step 72 does not decrement the trigger delay below zero and the increment step 78 does not increment the trigger delay above the maximum trigger delay, for example, 60% trigger delay.

Referring to FIG. 8, a fourth flow chart of the operation of a typical program running in the processor 8 is described. In this example, an over-current situation was detected. A determination is made 200 as to whether it is safe to automatically attempt to restart the motor 5. In some embodiments, this determination is built-in as a flag within the system program while in other embodiments this determination is based upon an external indication such as a switch 19, jumper or any other known input parameter used to control the flow of the program. In some systems, the determination 200 is made through signaling by a remote authority, etc. In systems with input switches 19, this determination 200 is made by reading one or more switches 19. If it is deemed safe 200 to automatically restart the motor 5, a delay is performed 202, for example, a three-minute delay or other suitable delay, and then the system is reset by a master reset such as a software reset that is similar to a power cycle of the system 1. If it is not deemed safe 200 to automatically restart the motor 5, the system 1 waits for an external stimulus 204 such as the closure of a reset switch 19, and, after the switch is closed/pressed, the system is reset by a master reset such as a software reset that is similar to a power cycle of the system 1.

The external stimulus is anticipated to be any known restart stimulus such as pressing of a switch 19 or a communications from the remote authority through the radio 30 or network interface 36.

Figure 9:
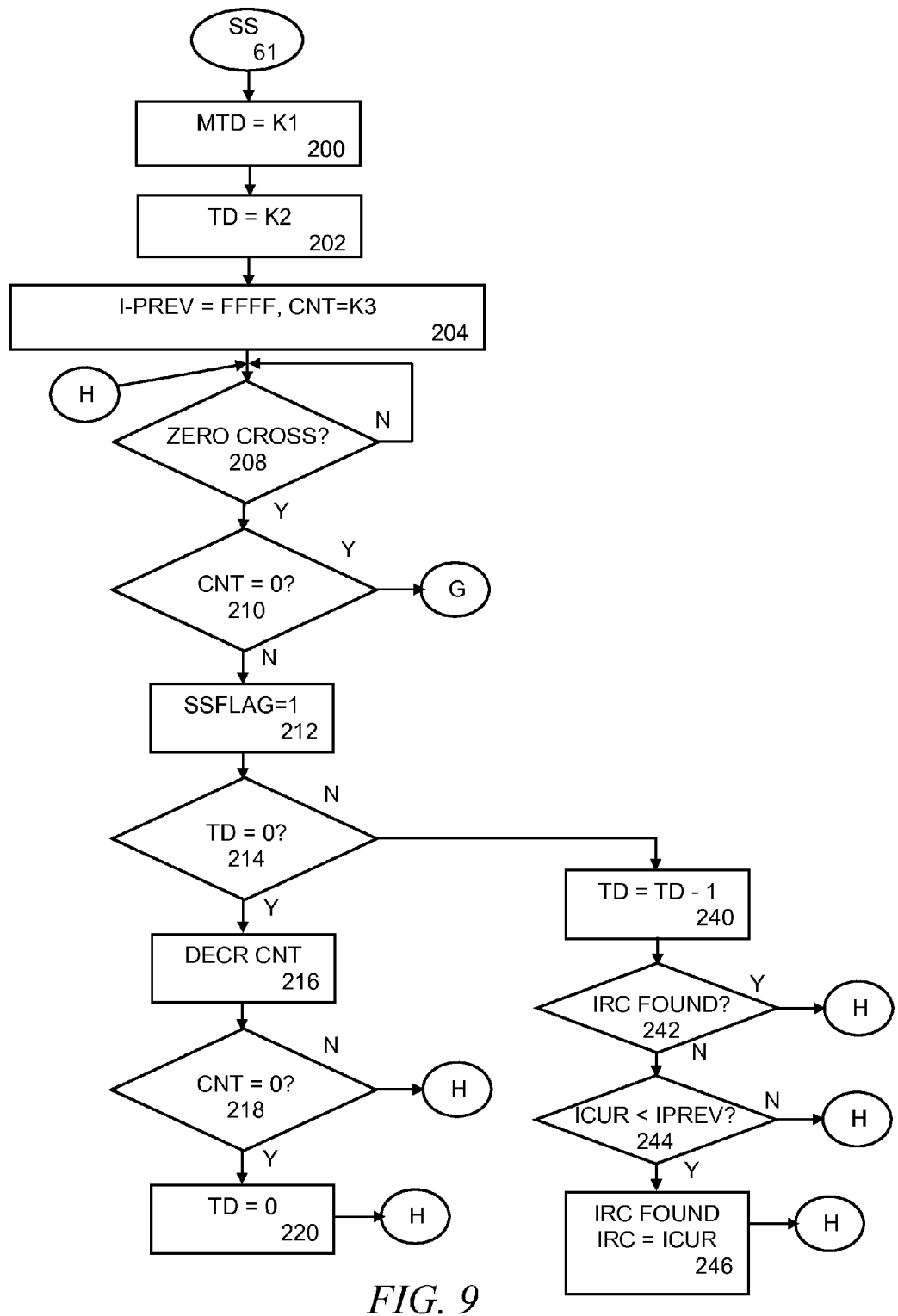
FIG. 9 illustrates a fifth flow chart of the system for controlling the single-phase motor.
Figure 10:
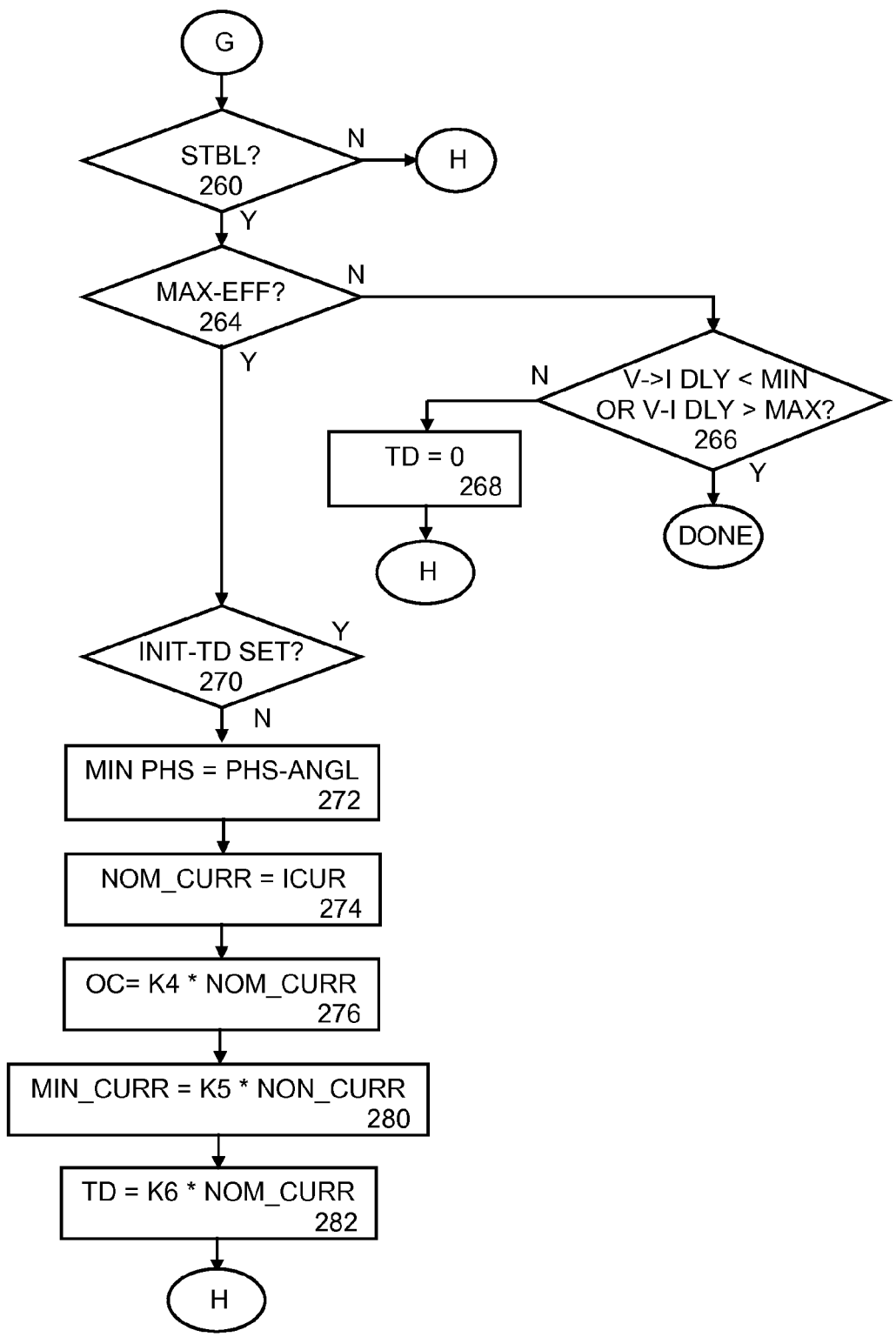
FIG. 10 illustrates a sixth flow chart of the system for controlling the single-phase motor.
Figure 11:
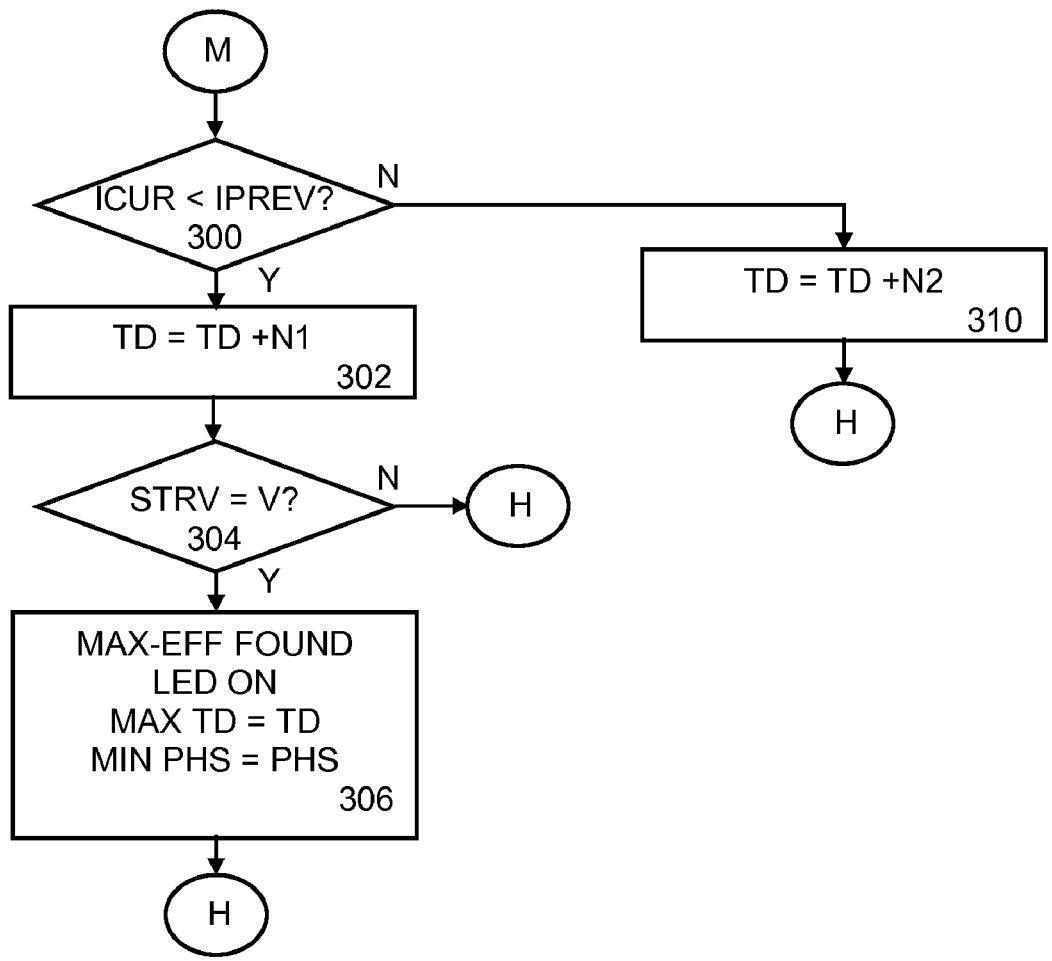
FIG. 11 illustrates a seventh flow chart of the system for controlling the single-phase motor.
Figure 12:
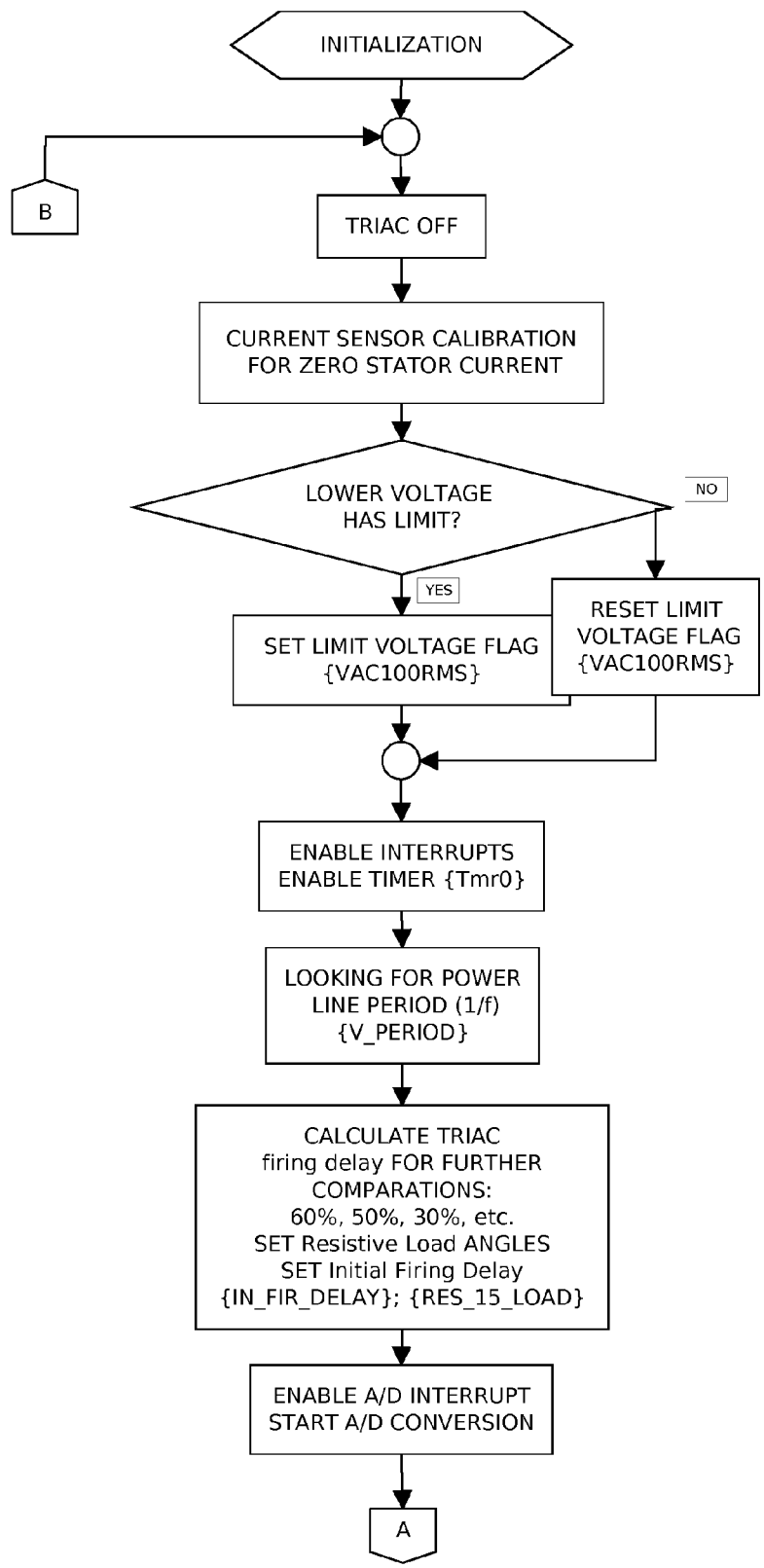
FIGS. 12-29 illustrate a detailed flow chart of an exemplary working system.
Figure 13:
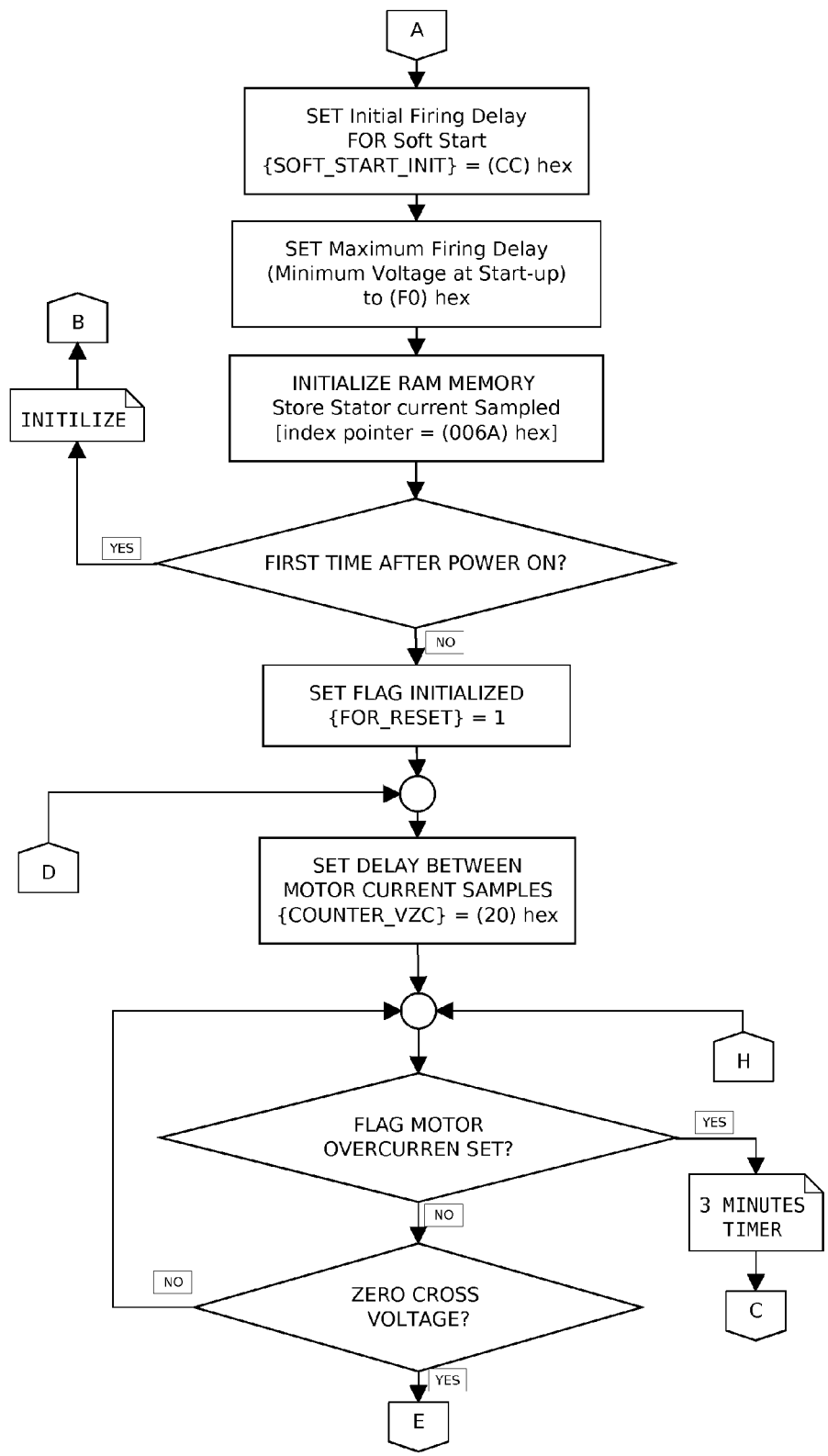
Figure 14:
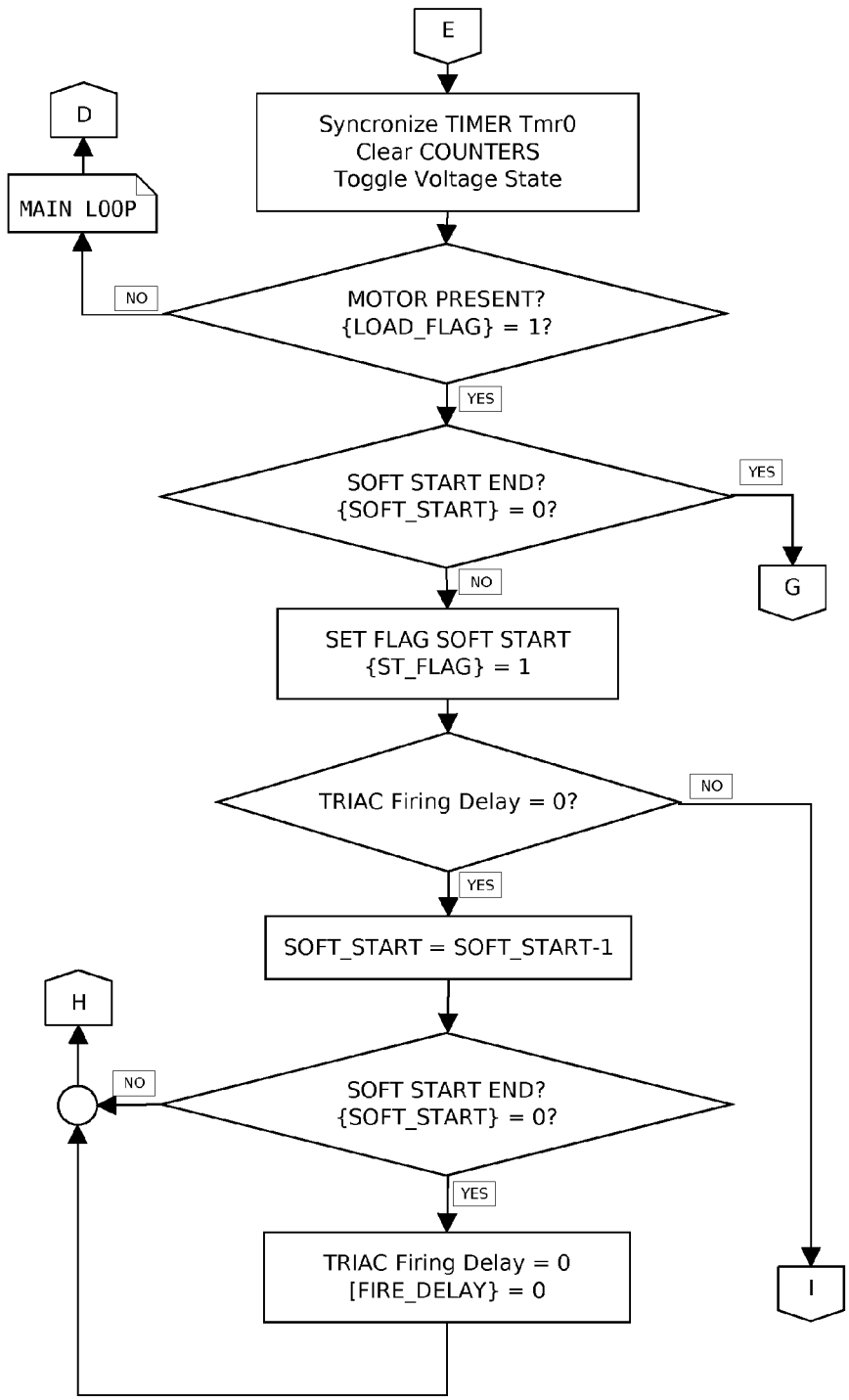
Figure 15:
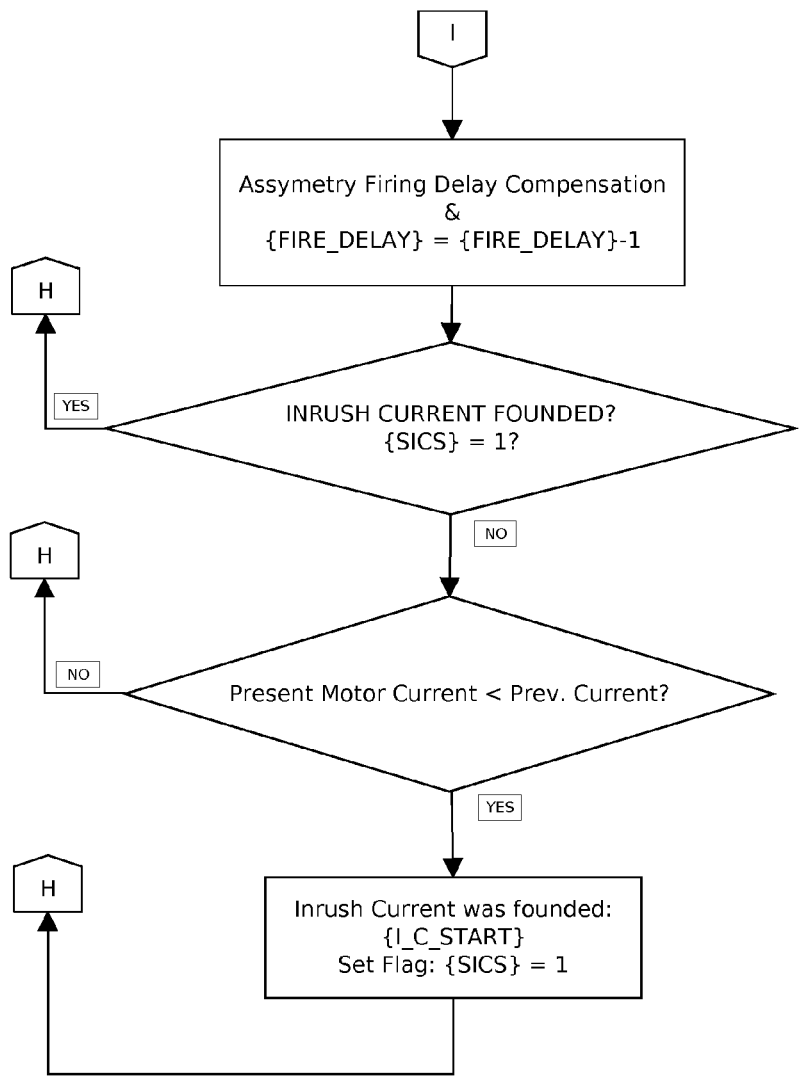
Figure 16:
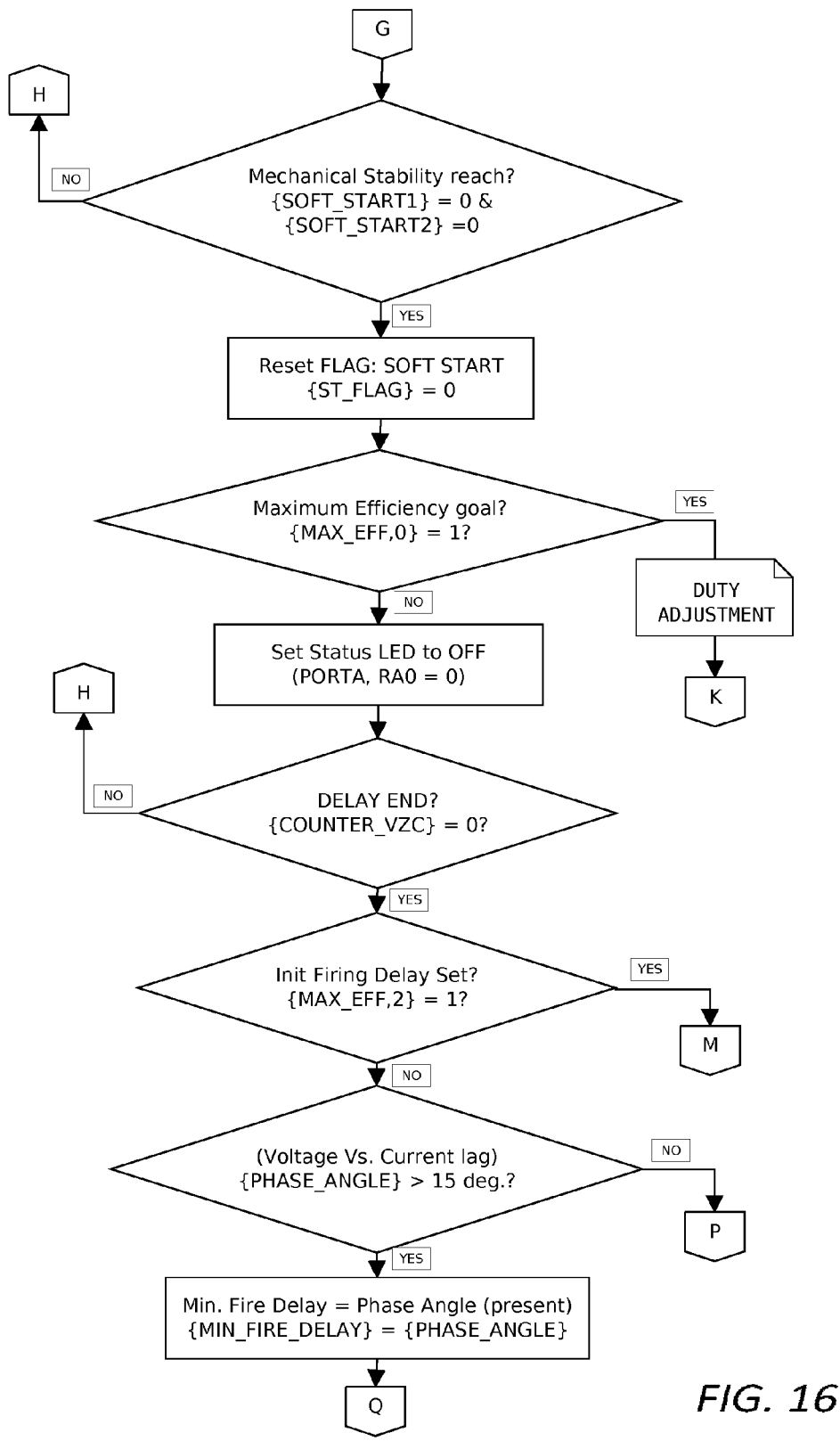
Figure 17:
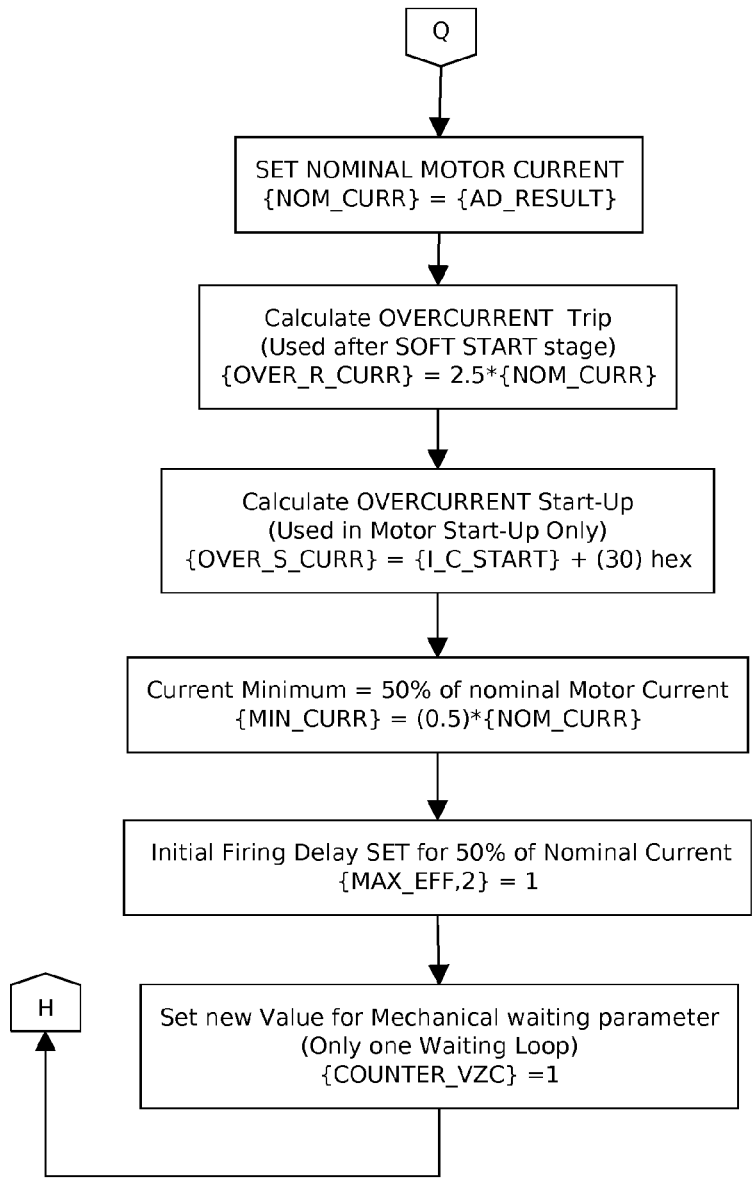
Figure 18:
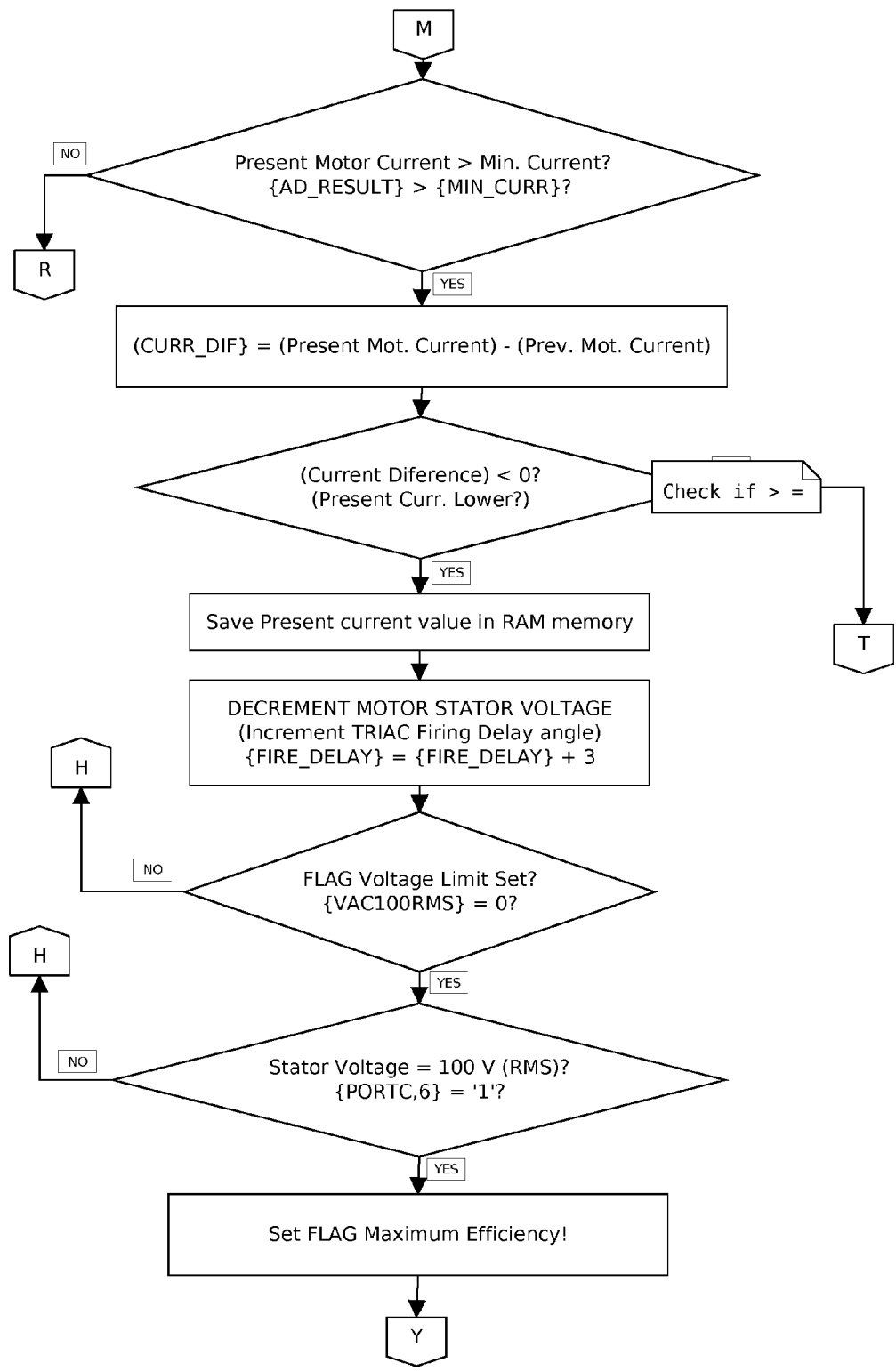
Figure 19:
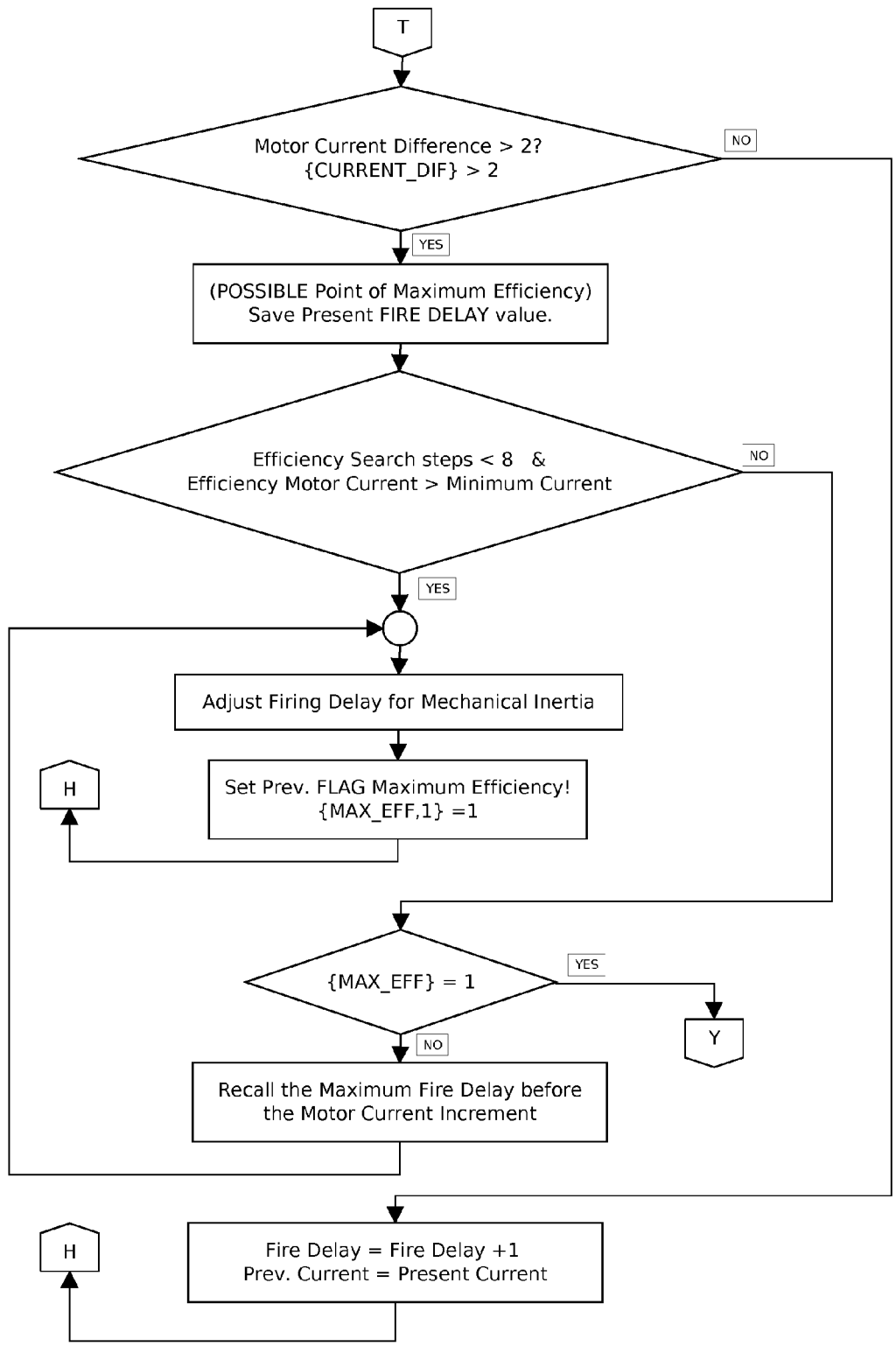
Figure 20:
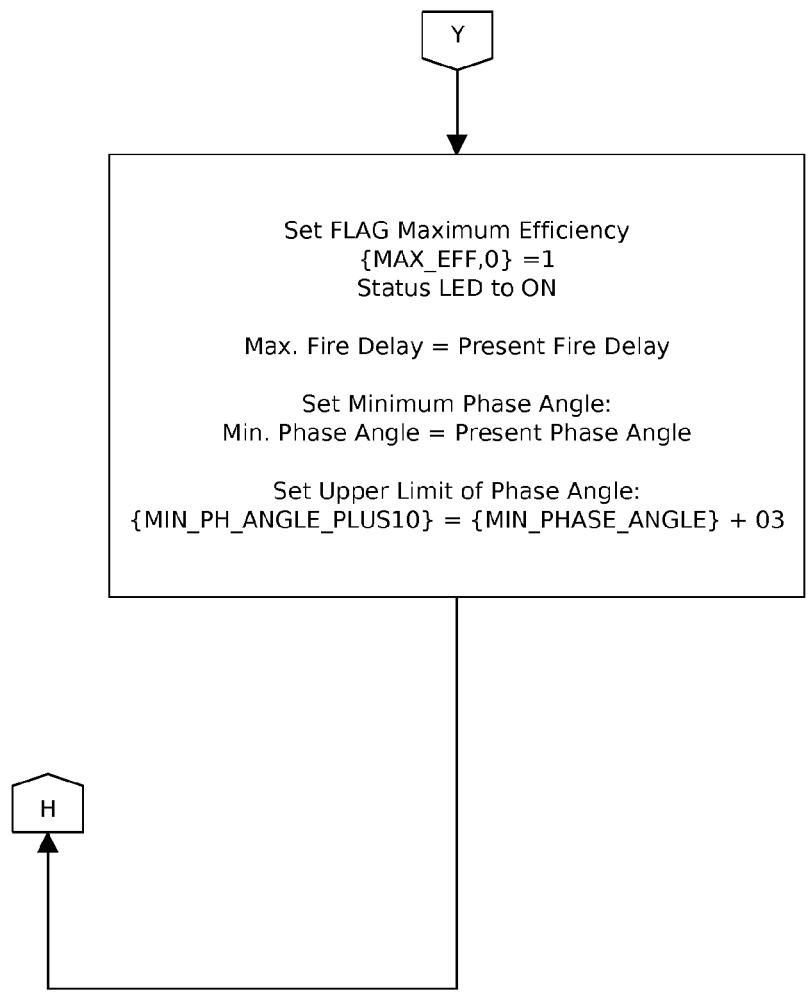
Figure 21:
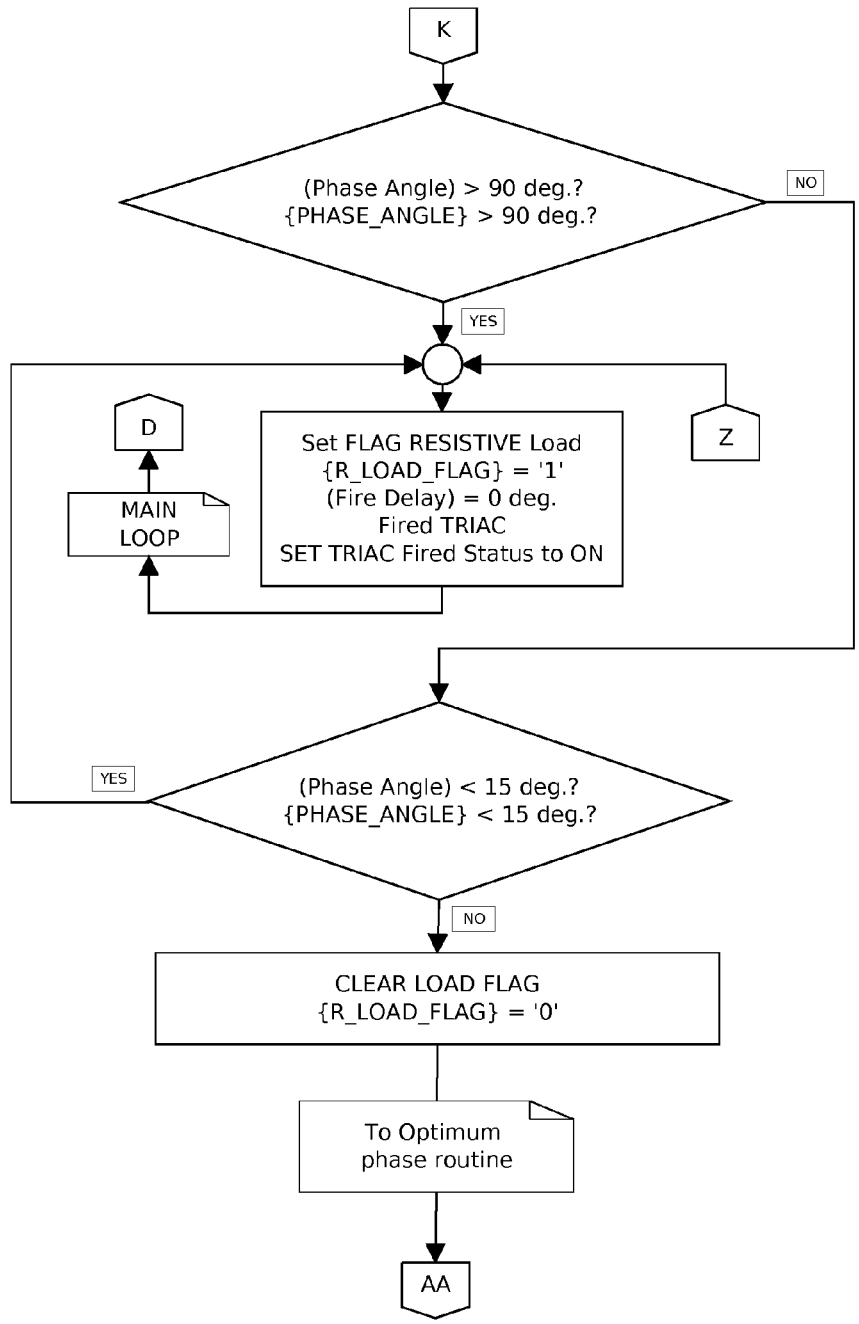
Figure 22:
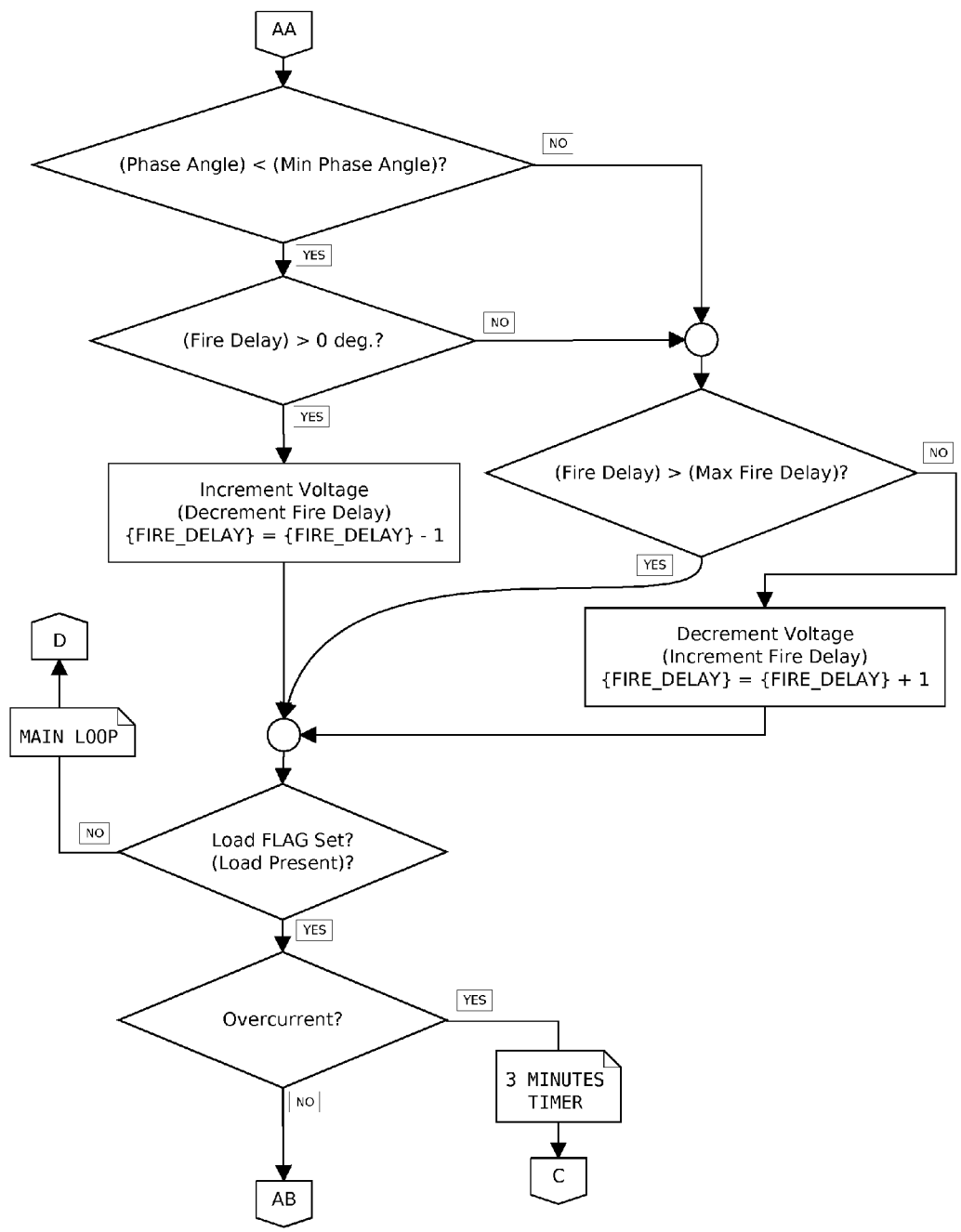
Figure 23:
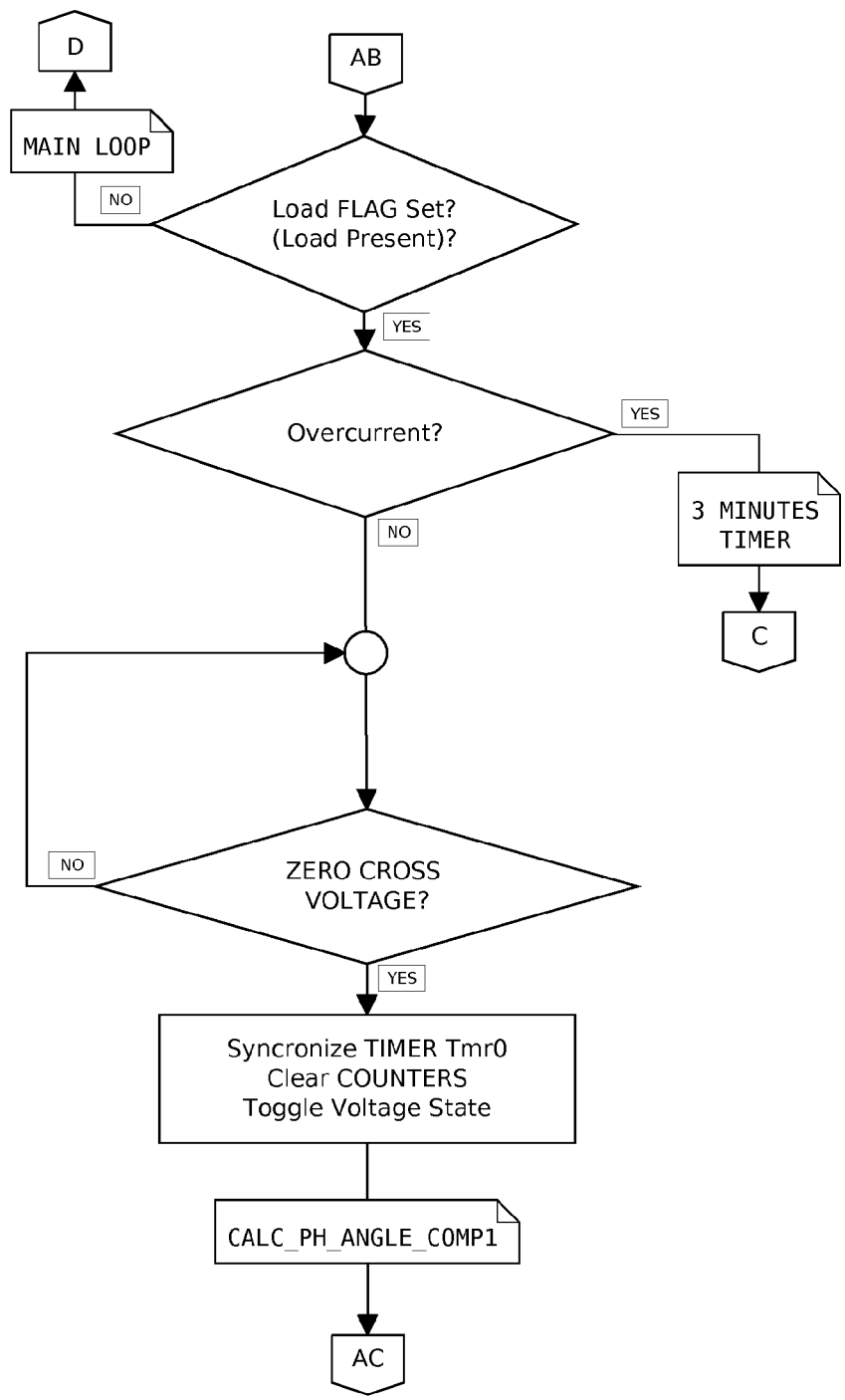
Figure 24:
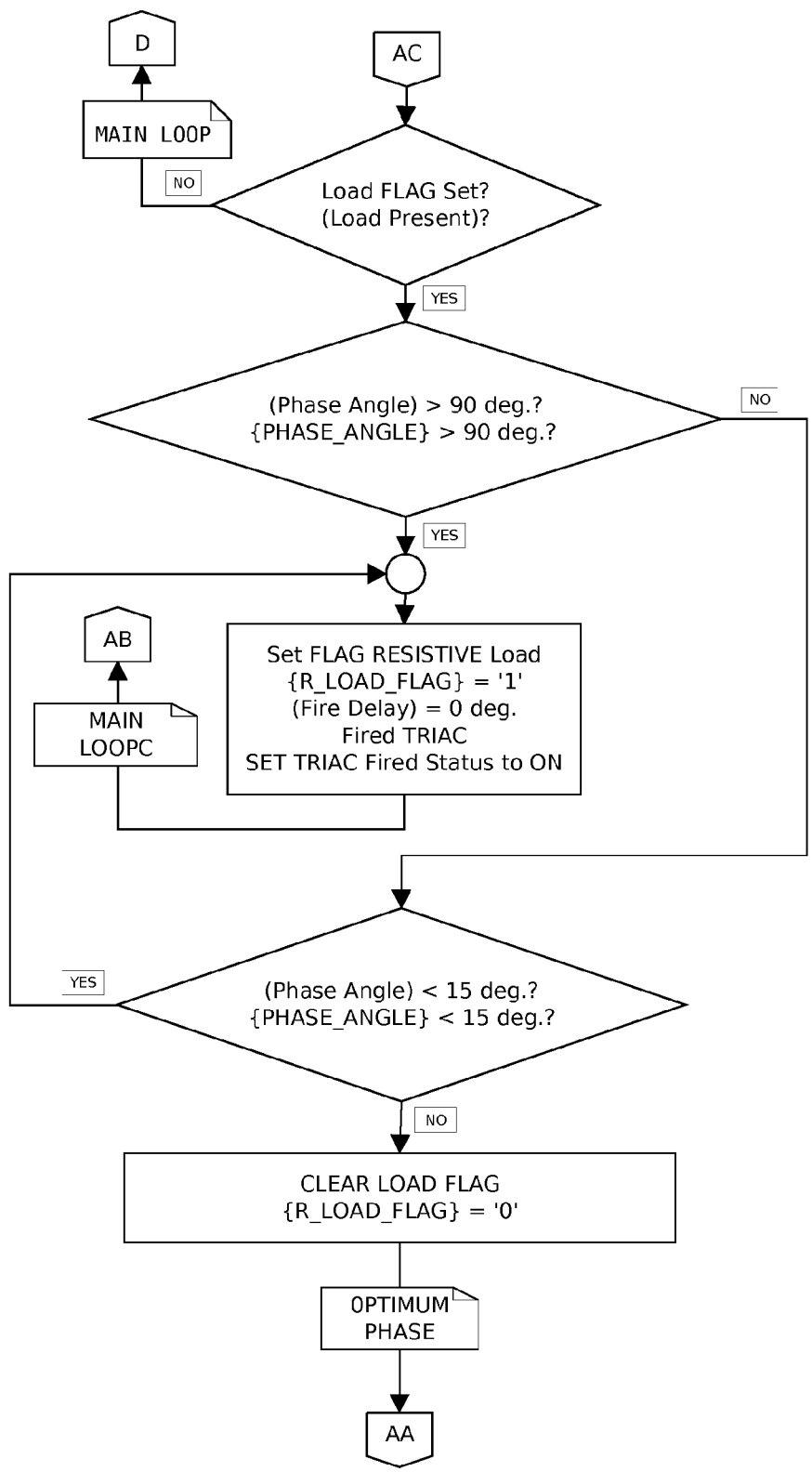
Figure 25:
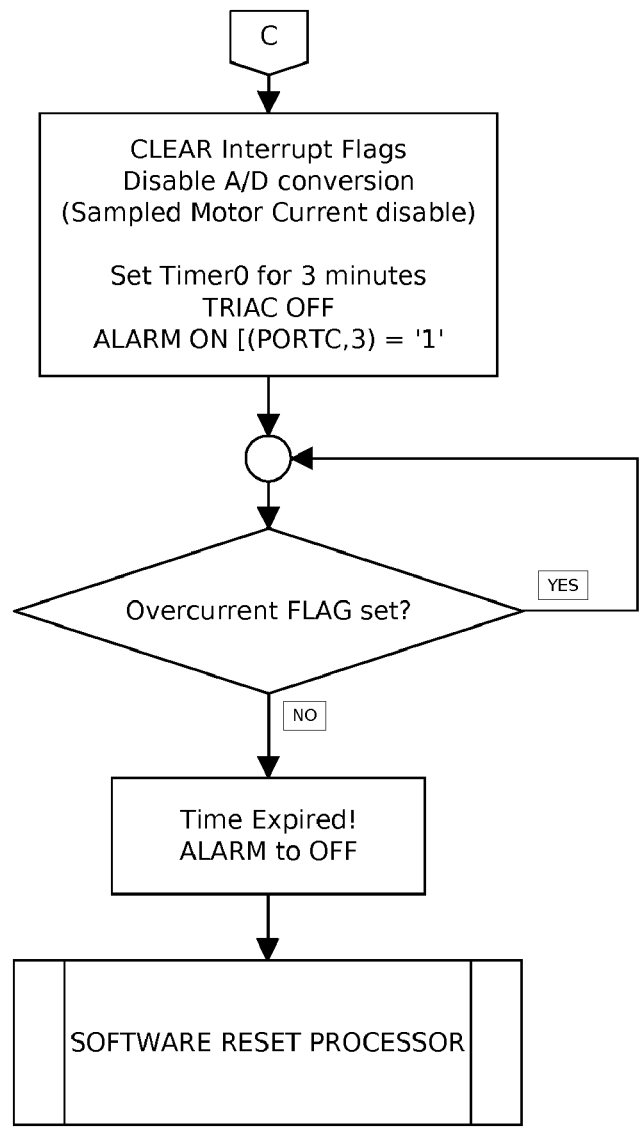
Figure 26:
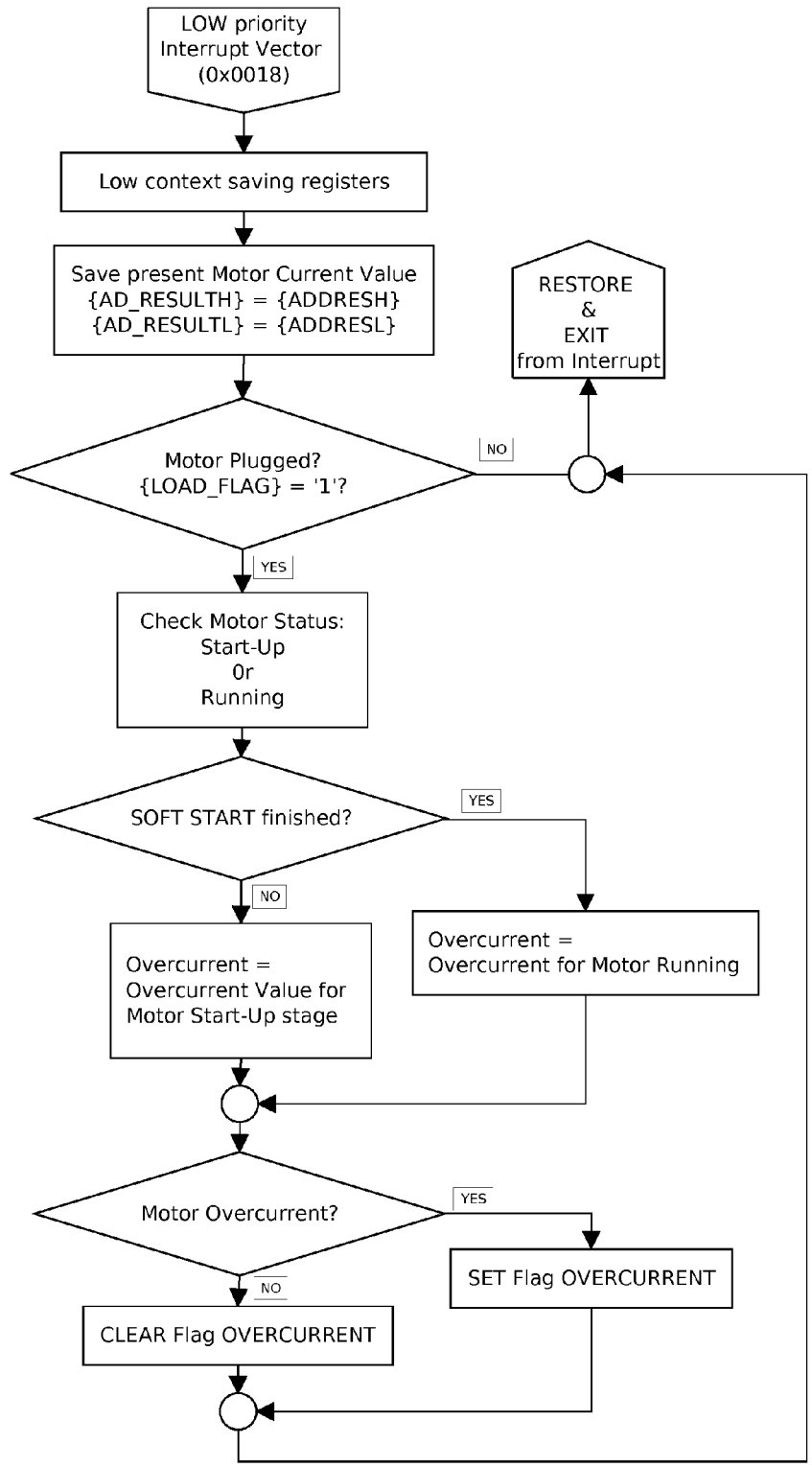
Figure 27:
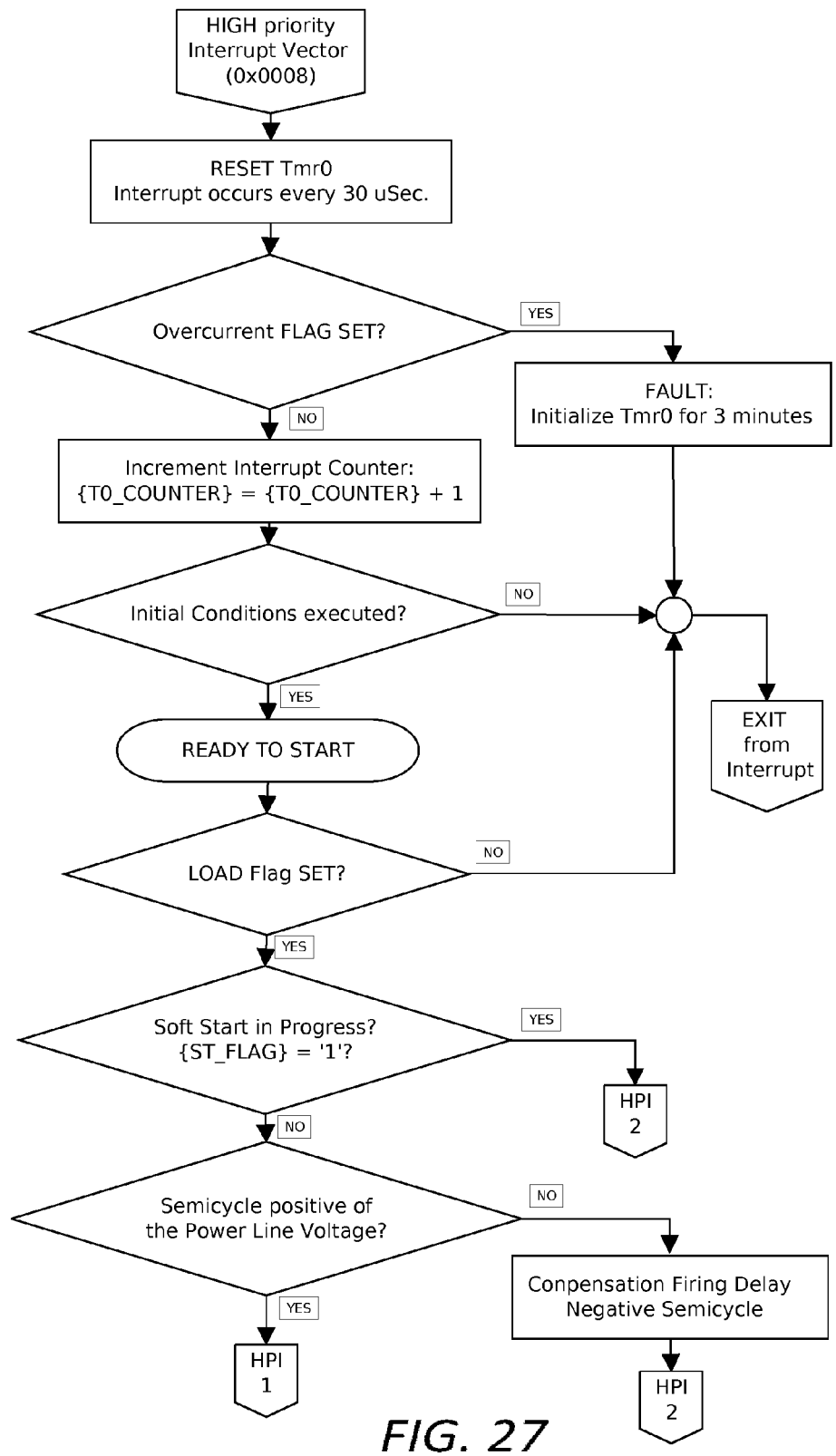
Figure 28:
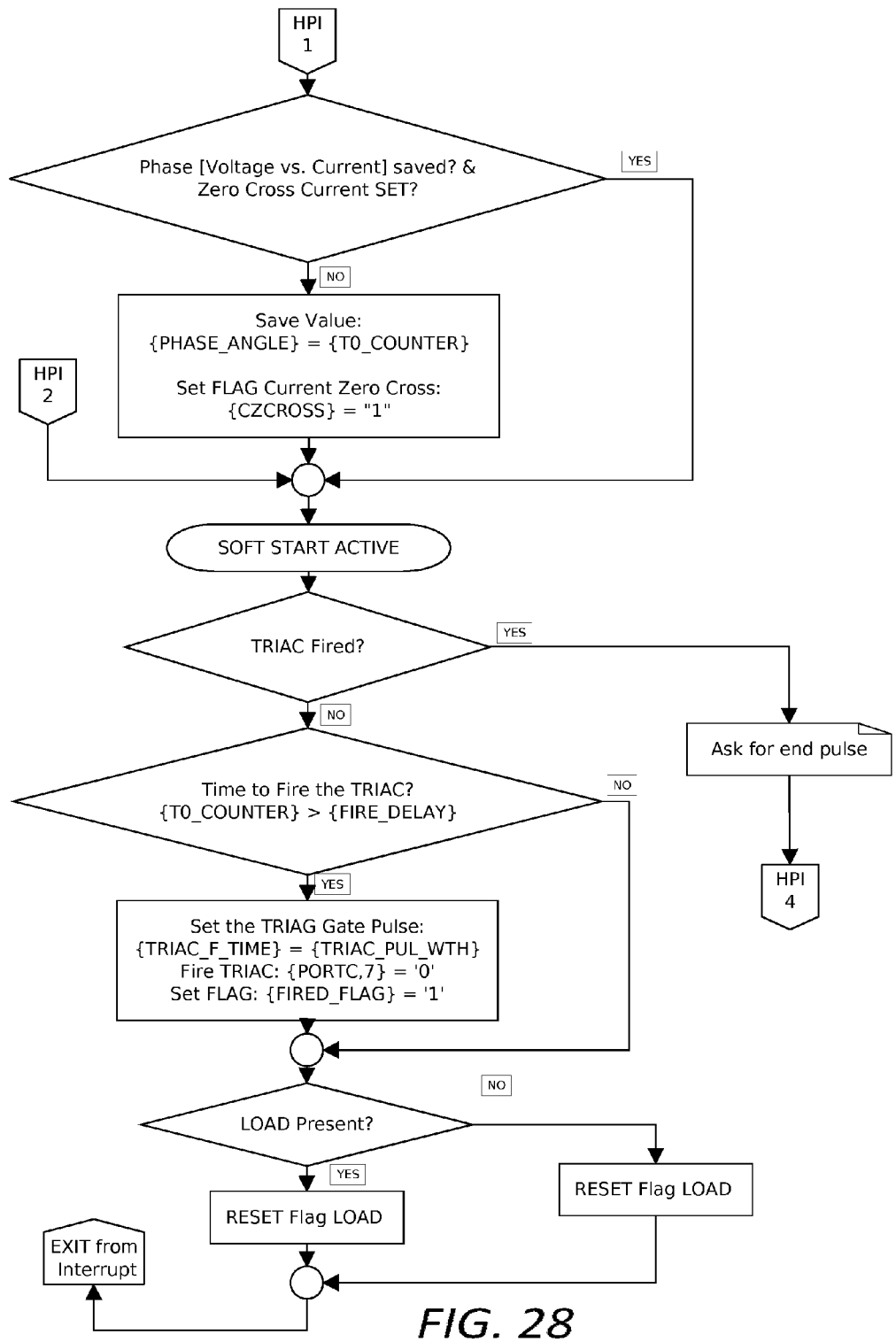
Figure 29:
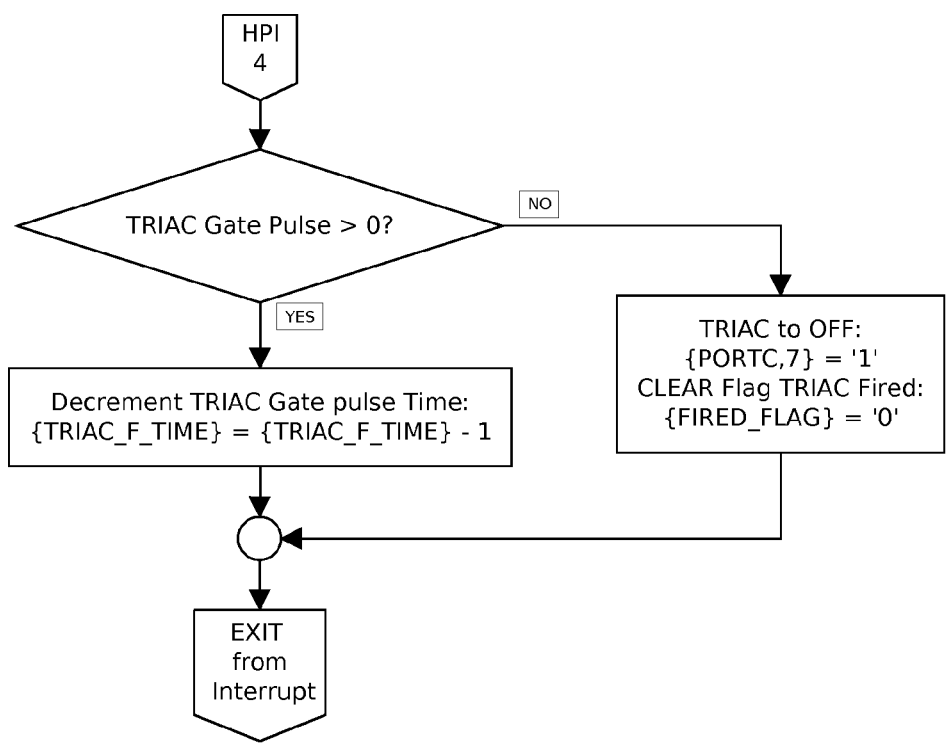

Referring to FIGS. 9, 10 and 11, a fifth, sixth and seventh flow chart of the operation of a typical program running in the processor 8 is described. This flow describes the soft-start process 61. In general, applying full power to a motor on start-up produces unwanted noise, torque, vibration and a waste of energy. Additionally, after a power failure, it has been found that the power to thousands of induction motors, all starting at the same time, creates a large demand on the power grid. This large demand must be factored into the engineering of the power grid such that the grid will not fail under the load of so many induction motors. To reduce this start-up load, several optional features of the system 1 are provided. One is a simple delay between power coming on and when the system 1 provides power to the motor. This delay is anticipated to be a fixed delay (e.g. 5 seconds) or a random delay (e.g. random between 10 seconds and 5 minutes).

The soft-start method gradually applies enough power to overcome inertia of the motor's 5 stator and load but not too much power as to over-drive the motor. In this, the power to the motor is gradually increased until it is detected that the motor has reached a steady state An exemplary method of soft-start 61 includes initializing the minimum voltage that is applied to the motor 5 (maximum trigger delay, or MTD) to a first constant, K1. During the soft-start procedure, the trigger delay will not exceed the maximum trigger delay (MTD) and, therefore, the voltage to the motor 5 will not be decreased lower than a predetermined value. The maximum trigger delay (MTD) is initially set 200 to a constant value, K1 such as 240 (0xF0). Next, the trigger delay is initialized to an initial trigger delay 202 of a second constant value, K2, such as 204 decimal (0xCC) providing a starting voltage to the motor 5. The maximum trigger delay (MCD) and initial trigger delay (TD) are preferably set to these values and in other embodiments, other similar values are used.

Next, for embodiments that limit looping, a counter is initialized to 255 and the previous current reading is set to a very high value (FFFF) 204. The soft-start routine uses the counter to make a fixed number of loops.

Next, the system waits for the zero crossing 208. After the zero crossing, the counter, CNT, is checked to see if it has reached zero and, if so, program flow proceeds to G (see FIG. 10). If the counter, CNT, has not reached zero, the SS start flag is set 212. If it is determined that the maximum power is now applied 214 to the motor 5 (TD is zero), the counter, CNT, is decremented 216 and if the counter reaches zero 218, the trigger delay, TD, is set to zero 220, applying maximum power to the motor 5. In either case, the process repeats at H above. If it was determined that less than maximum power was applied 214 to the motor 5, the trigger delay is decremented by one 240. Now, if the inrush current was not previously found 242 and the measured current (ICUR) is less than the previously measured current (IPREV) 244, it is determined that the inrush current has been found and a flag is set to indicate this and the currently measured current is saved to indicate the inrush current 246.

Until the count, CNT, reaches zero 210, the voltage to the motor 5 in slowly increased by decreasing the trigger delay (TD) 240 by, for example, one, each time through the loop, then measuring the current through the motor 5, I-CUR. If the current actually decreases 244 (I-PREV is less than I-CUR), then the inrush current has been detected and it is saved for future use 246.

Once the count reaches zero 210, flow proceeds with G in FIG. 10. If motor stability has not been achieved 260, the loop repeats from H until stability is achieved 260. If motor stability has been achieved 260, a determination is made as to whether maximum efficiency has been found 264. If maximum efficiency has been found then it is determined if the initial trigger delay has been set 270. If it has not been set, then the minimum phase angle is set to the current phase angle 272, the nominal current is set to the current reading of the current (ICUR) 274, the over current is set to the nominal current multiplied by a constant 276, K4, typically 2.5 times the nominal current 276, the minimum current (MIN_CURR) is set to the nominal current multiplied by a constant 280, K5, typically a value less than 1, preferably 0.5 and the trigger delay is set to the nominal current multiplied by a constant 282, K6, typically also a value less than 1, preferably 0.5.

The loop is then repeated from H.

If motor stability has not been achieved 260, the loop repeats from H until stability is achieved 260. If the maximum efficiency has not been found then the determination is made as to whether the voltage to current phase delay is between a minimum value and a maximum value 266. If the voltage to current phase delay is not between a minimum value and a maximum value 266, as is expected with resistive loads, the trigger delay is set to zero 268, thereby providing full power to the load and the loop is repeated from H (i.e., until the load of an induction motor 5 is detected). If the voltage to current phase delay is between a minimum value and a maximum value 266, then the soft start is complete and flow returns (se FIGS. 5, 6 and 7).

If motor stability has been achieved 260 and maximum efficiency has been found 264 and the initial trigger delay has been set 270, flow proceeds with M in FIG. 11. In this the current to the motor is measured (ICUR) and compared to the previous current to the motor (IPREV) 300. If the current to the motor (ICUR) is less than the previous current to the motor (IPREV) 300, the trigger delay is incremented 302 by a value, N1. N1 is typically a value of 3 (N1=3) to decrease the power/voltage to the motor 5. If the detected stator voltage reaches a predetermined voltage 304, V, such as 100V RMS, the maximum efficiency has been found and, in embodiments with an indicator, the indicator is illuminated. Then the maximum trigger delay is set to the current trigger delay and the minimum phase difference is set to the current phase difference between the voltage and the current waveforms 306. Finally the loop then repeats from H. If the current to the motor (ICUR) is greater than or equal to the previous current to the motor (IPREV) 300, the trigger delay is incremented 310 by a value, N2. N2 is typically a value of by 1 (N2=1) to decrease the power/voltage to the motor 5. Finally the loop then repeats from H.

The following is a very detailed, self-describing flow

Referring to FIGS. 12-29, a detailed flow chart of an exemplary working system is shown. This flow chart includes details of operation of an exemplary operating model and does not limit the disclosed invention.

Equivalent elements can be substituted for the ones set forth above such that they perform in substantially the same manner in substantially the same way for achieving substantially the same result.

It is believed that the system and method as described and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A system for saving power consumed by an induction motor, the system comprising:
   a source of AC voltage;
   a processor;
   a means for controlling power to the induction motor, the means for controlling power connected in series with the source of the AC voltage and the induction motor, the means for controlling including a trigger, the trigger controlled by the processor to fire the means for controlling at a trigger delay into each cycle of the AC voltage, whereas full power is supplied to the induction motor when the trigger delay is zero;
   a means for measuring current drawn by the motor;
   a means for measuring the AC voltage;
   a means for measuring a phase difference between a phase of the AC voltage and a phase of the current;
   a means for initializing power provided to the induction motor, the means for initializing determining a minimum phase angle, a minimum trigger delay, a maximum trigger delay and an over-current value; and
   a means for continuously varying the trigger delay between the minimum trigger delay and the maximum trigger delay, if the trigger delay is greater than zero the trigger delay is decremented when the phase difference is less than the minimum phase angle and if the trigger delay is less than the maximum trigger delay, the trigger delay is incremented when the phase difference is greater or equal to the minimum phase angle and the trigger delay.

2. The system for saving power of claim 1, wherein the means for continuously varying further comprises a means for measuring the present current to the induction motor and if present current is greater that the over-current value, delaying for a period of time and then resetting the system for saving power.

3. The system for saving power of claim 1, wherein the means for continuously varying further comprises a means for measuring the present current to the induction motor and if present current is greater that the over-current value, waiting until a reset is generated, after the reset is generated, resetting the system for saving power.

4. The system for saving power of claim 3, wherein the reset is generated by a switch, and the switch is interfaced to an input port of the processor.

5. The system for saving power of claim 1, further comprising a means for communicating and a means for waiting for a start signal from the means for communicating before applying power to the induction motor.

6. The system for saving power of claim 5, further comprising a means for monitoring the means for communicating and, responsive to a stop command, resetting the system for saving power until the means for communicating receives another start signal.

7. The system for saving power of claim 1, wherein the means for initializing power further comprises a means for soft-starting the induction motor, thereby gradually applying the power to the induction motor.

8. A method for saving power consumed by an induction motor comprising:
(a) soft starting the motor by applying a voltage to the motor that is less than a voltage rating of the motor and gradually increasing the voltage to the motor, the current to the motor being monitored to determine a nominal current;
(b) calculating an over-current value from the nominal current;
(c) calculating a minimum-current from the nominal current;
(d) calculating an initial voltage to the motor from the nominal current;
(e) setting a minimum-phase angle to a phase angle between the voltage to the motor and the current to the motor;
(f) setting a minimum-voltage to the motor to the current voltage to the motor;
(g) measuring the phase angle between the voltage to the motor and the current to the motor;
(h) if the measured phase angle is less than the minimum-phase angle and the voltage to the motor is less than a full-voltage, increasing the voltage to the motor and repeating from step (g); and
(i) if the measured phase angle is greater than or equal to the minimum-phase angle and the voltage to the motor is greater than the minimum-voltage to the motor, decreasing the voltage to the motor and repeating from step (g).

9. The method of claim 8, step (g) further comprising measuring the current to the motor and if the current to the motor is greater than the over-current value, disabling voltage to the motor until a reset is detected.

10. The method of claim 9, wherein the reset is a reset switch.

11. The method of claim 9, wherein the reset is a timer.

12. The method of claim 8, wherein the calculating of the over-current value from the nominal current is by multiplying the nominal current by approximately 2.5.

13. The method of claim 8, wherein calculating of the minimum-current from the nominal current is by multiplying the nominal current by approximately 0.5.

14. The method of claim 8, wherein prior to step (a), a communications link is established to a control system and the step of waiting for a start indication from the control system is performed before continuing with step (a).

15. A system for saving power consumed by an induction motor, the system comprising:
a source of AC voltage;
a processor;
a solid-state switch, the solid-state switch in series with the source of the AC voltage and the induction motor, the solid-state switch controlled by a trigger, the trigger controlled by the processor to fire the solid-state switch at a trigger delay into each cycle of the AC voltage, whereas full power is supplied to the induction motor when the trigger delay is zero;
a circuit that measures the current drawn by the motor, the circuit that measures the current drawn by the motor interfaced to the processor;
a circuit for measuring the AC voltage, the circuit for measuring the AC voltage interfaced to the processor;
software running on the processor that initializes power to the induction motor by setting the trigger delay to a value that delivers less than full voltage to the induction motor, the software running on the processor that initializes power to the induction motor gradually decreases the trigger delay while measuring a current drawn by the motor, detecting when the current decreases at which time the software running on the processor that initializes power to the induction motor determines a minimum phase angle, a maximum trigger delay and an over-current value; and
software running on the processor maintains efficiency by measuring a phase difference between a phase of the AC voltage as measured by the circuit for measuring the AC voltage and a phase of the current as measured by the circuit for measuring the current and by varying the trigger delay between the minimum trigger delay and a maximum trigger delay, the trigger delay is decremented when the trigger delay is greater than zero and the phase difference is less than the minimum phase angle and the trigger delay is incremented when the trigger delay is less than the maximum trigger delay and the phase difference is greater or equal to the minimum phase angle.

16. The system for saving power of claim 15, wherein the software running on the processor that maintains efficiency further measures a current to the induction motor and if the current is greater than the over-current value, the software running on the processor that maintains efficiency delays for a period of time and then resets the system for saving power.

17. The system for saving power of claim 15, wherein the software running on the processor that maintains efficiency further measures a current to the induction motor and if the current is greater than the over-current value, the software running on the processor that maintains efficiency waits for a signal from an external source and then resets the system for saving power.

18. The system for saving power of claim 17, wherein the external source is a switch, the switch is interfaced to an input port of the processor.

19. The system for saving power of claim 15, further comprising software that communicates with a remote system, the software that communicates with the remote system waits for a start signal before applying power to the induction motor.

20. The system for saving power of claim 19, wherein the software that communicates with the remote system periodically monitors the remote and, responsive to a stop command, resetting the system for saving power until the software that communicates with the remote system receives another start signal from the remote system.

* * * * *